(12) United States Patent
Custer

(10) Patent No.: US 8,470,414 B2
(45) Date of Patent: Jun. 25, 2013

(54) VEHICLE ORNAMENTS, KITS CONTAINING THE SAME, AND METHODS OF MAKING AND USING THE SAME

(76) Inventor: Corey Custer, McDonough, GA (US)

( * ) Notice: Subject to any disclaimer, the term of this patent is extended or adjusted under 35 U.S.C. 154(b) by 530 days.

(21) Appl. No.: 12/795,341

(22) Filed: Jun. 7, 2010

(65) Prior Publication Data

US 2011/0059271 A1 Mar. 10, 2011

Related U.S. Application Data

(60) Provisional application No. 61/241,045, filed on Sep. 10, 2009.

(51) Int. Cl.
*B60R 13/00* (2006.01)
*B60R 11/00* (2006.01)
(52) U.S. Cl.
USPC ................. 428/31; D12/197; 40/591; 280/762
(58) Field of Classification Search
USPC ....... 428/31; D12/197; 280/727, 762; 40/413, 40/591
See application file for complete search history.

(56) References Cited

U.S. PATENT DOCUMENTS

| D112,486 | S | * | 12/1938 | Nusz | D12/197 |
| D472,869 | S | * | 4/2003 | Wu | D12/400 |
| D509,780 | S | * | 9/2005 | James | D12/197 |
| 8,071,184 | B1 | * | 12/2011 | Dodt, Jr. | 428/31 |
| 2007/0048465 | A1 | * | 3/2007 | Minor | 428/31 |
| 2007/0092333 | A1 | * | 4/2007 | Viscount et al. | 403/349 |
| 2007/0124972 | A1 | * | 6/2007 | Ratcliffe | 40/591 |

OTHER PUBLICATIONS

"Spiked 33mm Nut Cover 4 3/16" High—Thread On," http://www.iowa80.com, Aug. 25, 2008.*

* cited by examiner

*Primary Examiner* — David Sample
*Assistant Examiner* — Nicholas W Jordan
(74) *Attorney, Agent, or Firm* — Withers & Keys LLC

(57) ABSTRACT

A vehicle ornament and a kit containing components to form the vehicle ornament that can be attached to an outer surface of a vehicle. The components of the kit include at least one vehicle ornament base member having a circular, substantially flat lower surface and at least one vehicle ornament upper shaped member having a three-dimensional cone-like, pyramid-like or thorn-like shape. The base member and the upper shaped member include complementary engagement members that are operatively adapted to enable non-rotatable connection of the base member to the upper shaped member. The overall height of the vehicle ornament is from about 10.2 cm to about 20.3 cm and the diameter of the circular, flat lower surface of the base member is from about 10.2 cm to about 20.3 cm.

11 Claims, 25 Drawing Sheets

VEHICLE ORNAMENTS, KITS CONTAINING THE SAME, AND METHODS OF MAKING AND USING THE SAME

CROSS-REFERENCE TO RELATED APPLICATIONS

This utility application claims the benefit of priority to U.S. Provisional Patent Application Ser. No. 61/241,045, filed on Sep. 10, 2009, and entitled "VEHICLE ORNAMENTS, KITS CONTAINING THE SAME, AND METHODS OF MAKING AND USING THE SAME," the subject matter of which is incorporated herein in its entirety.

FIELD OF THE INVENTION

The present invention relates to vehicle ornaments and kits containing a set of vehicle ornaments. The present invention further relates to methods of making and using vehicle ornaments and kits containing a set of vehicle ornaments.

BACKGROUND OF THE INVENTION

There exists a need in the art of vehicle kits to provide a simple, inexpensive way to modify a vehicle so as to add one or more features to the vehicle such as, for example, modifying an outer surface of an automobile.

SUMMARY OF THE INVENTION

The present invention addresses some of the difficulties and problems discussed above by the discovery of vehicle ornaments and kits containing a set of vehicle ornaments. The disclosed vehicle ornaments and kits provide a user with a simple and inexpensive method of adding distinct decorative features to the user's vehicle (e.g., car).

Accordingly, in one exemplary embodiment, the present invention is directed to a kit comprising two or more different or similar vehicle ornaments with each of the two or more different or similar vehicle ornaments being sized and operatively adapted to attach to an outer surface of a vehicle, wherein each vehicle ornament independently comprises at least one peak point positioned a distance of at least four inches from the outer surface of the vehicle as measured along any side surface of said vehicle ornament. The kit may comprise any number of different or similar vehicle ornaments. In some exemplary embodiments, a given kit comprises from two to eight different or similar individual vehicle ornaments.

The present invention is also directed to vehicle ornaments capable of engaging with an outer surface of a vehicle such as the hood of a car. In some exemplary embodiments, each vehicle ornament independently comprises (i) a substantially flat lower surface that is capable of engaging with the outer surface of a vehicle, (ii) a three-dimensional shape extending above the substantially flat lower surface, and (iii) one or more opposite peak points positioned away from the substantially flat lower surface. In some exemplary embodiments, each vehicle ornament independently comprises (I) a base member comprising (i) a substantially flat lower surface that is capable of engaging with the outer surface of a vehicle, and (ii) an upper base member surface; and (II) an upper shaped member comprising (i) a lower surface operatively adapted to engage with the upper base member surface, (ii) a three-dimensional shape extending above the lower surface of the upper shaped member, and (iii) one or more opposite surfaces or points positioned away from the lower surface of the upper shaped member.

One exemplary kit of the present invention comprising components to form at least one vehicle ornament, wherein each vehicle ornament is sized and operatively adapted to attach to an outer surface of a vehicle. In this exemplary embodiment, the kit comprises (I) at least one base member, each base member comprising (i) a substantially flat lower surface that is capable of engaging with the outer surface of a vehicle, and (ii) an upper base member surface; and (II) two or more upper shaped members, each upper shaped member independently comprising (i) a lower surface operatively adapted to engage with said upper base member surface, (ii) a three-dimensional shape extending above the lower surface of the upper shaped member, and (iii) one or more opposite surfaces or points positioned away from the lower surface of the upper shaped member.

The present invention is further directed to methods of making vehicle ornaments capable of engaging with an outer surface of a vehicle. In some exemplary embodiments, the method of making a vehicle ornament comprises forming a material into one or more vehicle ornaments, wherein each vehicle ornament independently comprises (i) a substantially flat lower surface that is capable of engaging with an outer surface of a vehicle, (ii) a three-dimensional shape extending above the substantially flat lower surface, and (iii) one or more opposite peak points positioned a distance of at least four inches from away from the substantially flat lower surface as measured along any side surface of the three-dimensional shape. In some exemplary embodiments, the forming step may comprise (I) forming a base member comprising (i) a substantially flat lower surface that is capable of engaging with the outer surface of a vehicle, and (ii) an upper base member surface; and (II) forming an upper shaped member comprising (i) a lower surface operatively adapted to engage with the upper base member surface, (ii) a three-dimensional shape extending above the lower surface of the upper shaped member, and (iii) one or more opposite surfaces or points (e.g., one or more peak points) positioned away from the lower surface of the upper shaped member.

The present invention is even further directed to methods of using vehicle ornaments to modify the look (i.e., appearance) of a vehicle. In some exemplary embodiments, the method of using vehicle ornaments comprises a method of modifying a vehicle (e.g., a car or a truck) comprising attaching two or more different or similar vehicle ornaments of the present invention onto an outer surface of the vehicle. In some exemplary embodiments, the step of attaching two or more different or similar vehicle ornaments onto an outer surface of the vehicle may comprise, for example, bonding or attaching a substantially flat lower surface of each vehicle ornament to the outer surface of the vehicle. In other exemplary embodiments, the step of attaching a given vehicle ornament onto an outer surface of the vehicle may comprise, for example, bonding or attaching a substantially flat lower surface of a base member of the vehicle ornament to the outer surface of the vehicle, the base member comprising (i) a substantially flat lower surface that is capable of engaging with the outer surface of a vehicle, and (ii) an upper base member surface; and bonding or attaching an upper shaped member to the upper base member surface of the base member, the upper shaped member comprising (i) a lower surface operatively adapted to engage with the upper base member surface of the base member, (ii) a three-dimensional shape extending above the lower surface of the upper shaped member, and (iii) one or more opposite surfaces or points positioned away from the lower surface of the upper shaped member.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to vehicle ornaments and kits containing the same. The disclosed vehicle ornaments and kits may be used to modify the appearance of a vehicle. For example, one or more vehicle ornaments of a given kit may be used to modify the outer surface of a vehicle such as a car. As discussed below, one or more similarly shaped vehicle ornaments may be used in combination to provide topographical features to an outer surface of a vehicle such as the hood or roof or both the hood and roof of a car or truck. In other embodiments, two or more differently shaped vehicle ornaments may be used in combination to provide topographical features to an outer surface of a vehicle.

Figure 1:
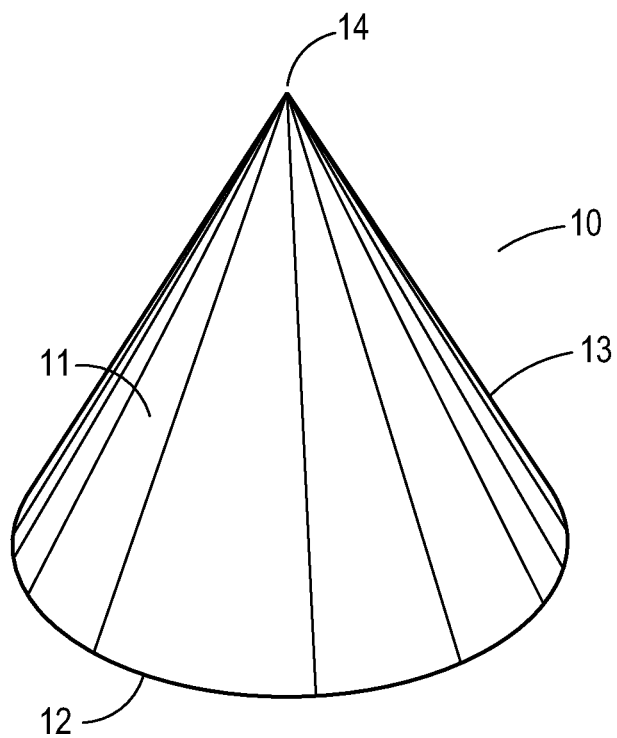
FIG. 1 is a front view of a cone-like vehicle ornament.

One exemplary vehicle ornament 10 of the present invention is shown in FIG. 1. As shown in FIG. 1, exemplary vehicle ornament 10 comprises a three-dimensional body 11, a substantially flat lower surface 12, outer side surface 13, and upper peak point 14. As used herein, the term "peak point" is used to describe a structural feature of a given vehicle ornament, wherein the structural feature comprises a point along an outer surface of the vehicle ornament and within a plane such that a line drawn in any direction from the point is below the plane (i.e., a peak point being similar to an apex of a mountain).

Substantially flat lower surface 12 is sized and operatively adapted to attach to and/or engage with an outer surface of a vehicle. As used herein, the term "substantially flat" is used to describe a lower surface having a surface configuration that enables a majority of an outer periphery of a given vehicle ornament to contact an outer surface of a vehicle (e.g., a car surface) on which the vehicle ornament is positioned. In some embodiments, substantially flat lower surface 12 will encompass vehicle ornaments wherein a majority of an outer periphery of the vehicle ornament is within a plane (e.g., when the outer surface of the vehicle is within a plane). In other embodiments, substantially flat lower surface 12 will encompass vehicle ornaments wherein portions of the outer periphery of the vehicle ornament curve such that the outer periphery is not within a single plane (i.e., when the outer surface of a vehicle is a curved vehicle surface). As described in further detail below, a substantially flat lower surface of a given vehicle ornament may further comprise one or more recessed surface portions positioned therein (i.e., for placement of a piece of double-sided tape for attachment of a given vehicle ornament to the outer surface of the vehicle).

Figure 2:
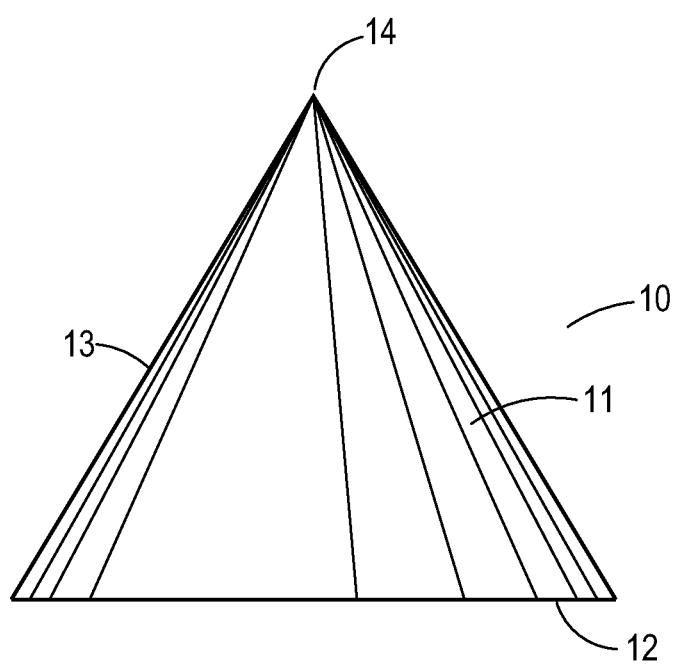
FIG. 2 is a side view of the cone-like vehicle ornament shown in FIG. 1.
Figure 3:
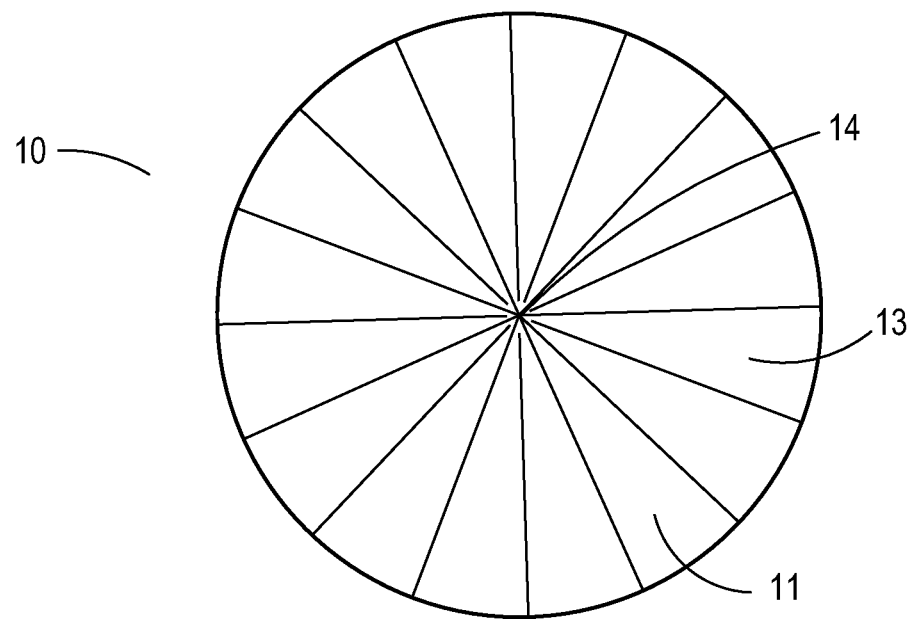
FIG. 3 is a top view of the cone-like vehicle ornament shown in FIG. 1.
Figure 4:
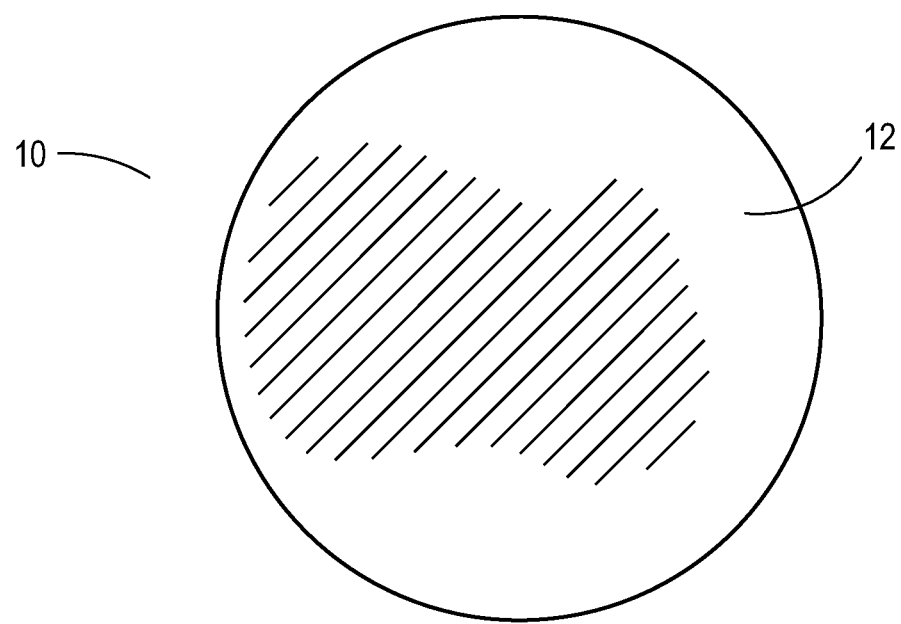
FIG. 4 is a bottom view of the cone-like vehicle ornament shown in FIG. 1.

FIG. 2 provides a side view of exemplary vehicle ornament 10. FIG. 3 provides a top view of exemplary vehicle ornament 10. FIG. 4 provides a bottom view of exemplary vehicle ornament 10.

Exemplary kits of the present invention may comprise one or more vehicle ornaments such as one or more of exemplary vehicle ornaments 10 having a cone-like shape. Other exemplary kits of the present invention may comprise one or more vehicle ornaments, wherein each of the one or more vehicle ornaments has a different shape such as a thorn-like shape as shown in FIG. 5.

Figure 5:
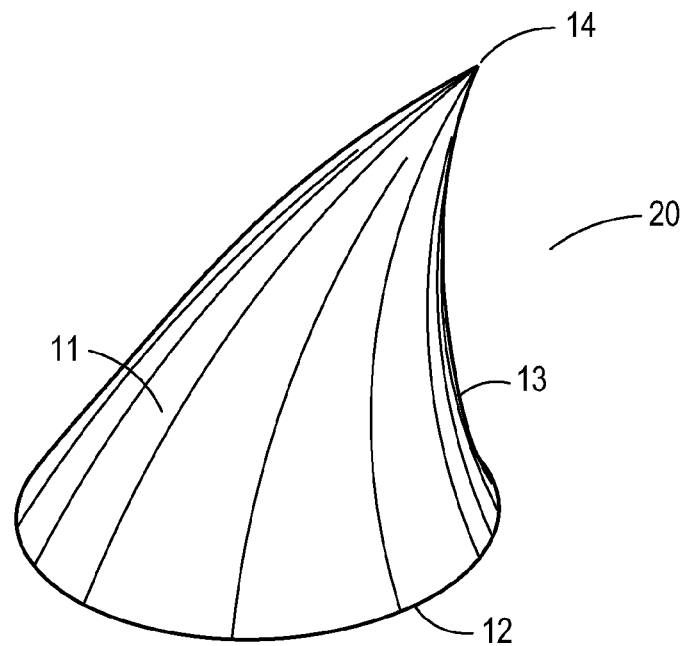
FIG. 5 is a side view of a thorn-like vehicle ornament.
Figure 6:
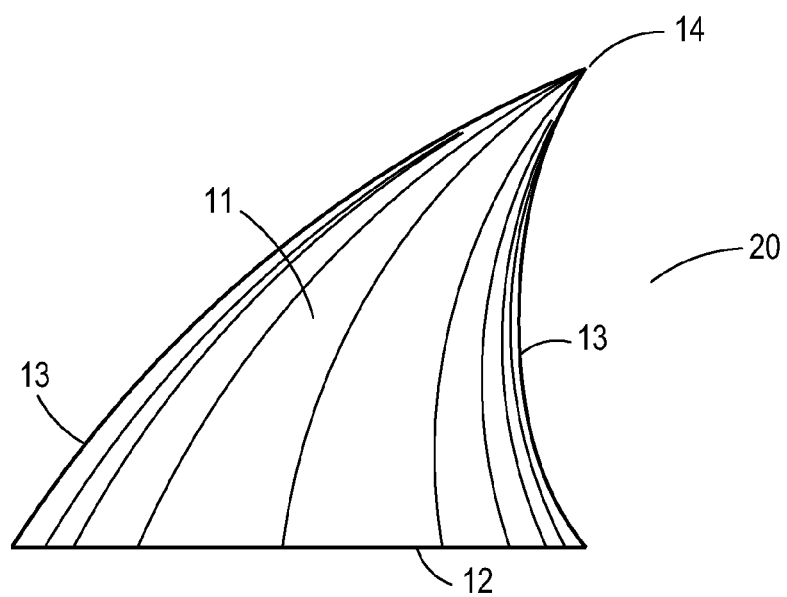
FIG. 6 is a side view of the thorn-like vehicle ornament shown in FIG. 5.
Figure 7:
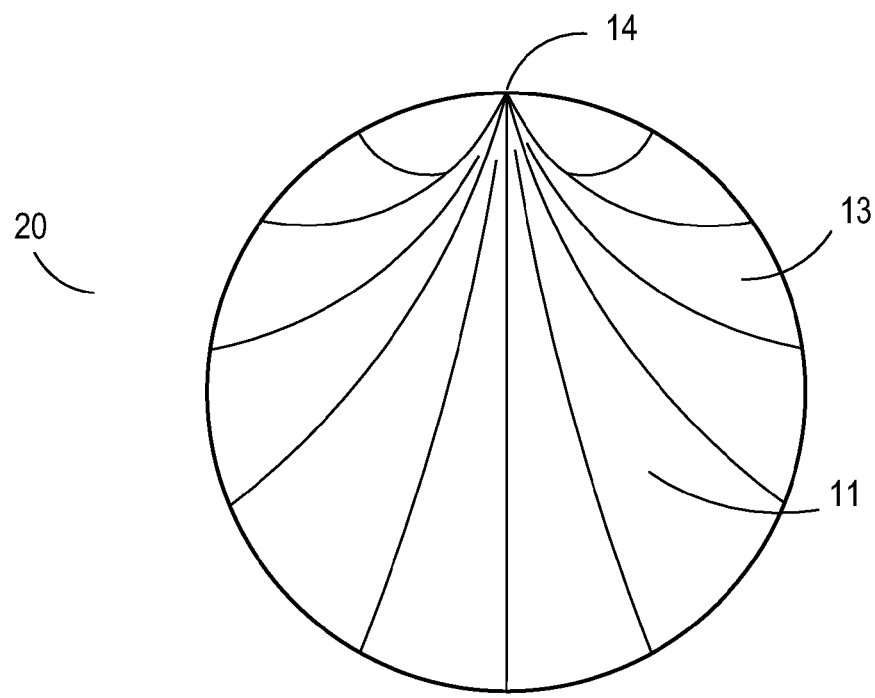
FIG. 7 is a top view of the thorn-like vehicle ornament shown in FIG. 5.

As shown in FIG. 5, exemplary vehicle ornaments of the present invention also include exemplary vehicle ornament 20 having a thorn-like shape. FIG. 5 provides a side elevational view of exemplary vehicle ornament 20 comprises three-dimensional body 11, substantially flat lower surface 12, outer side surface 13, and upper peak point 14. FIG. 6 provides a side view of exemplary vehicle ornament 20. FIG.

Figure 8:
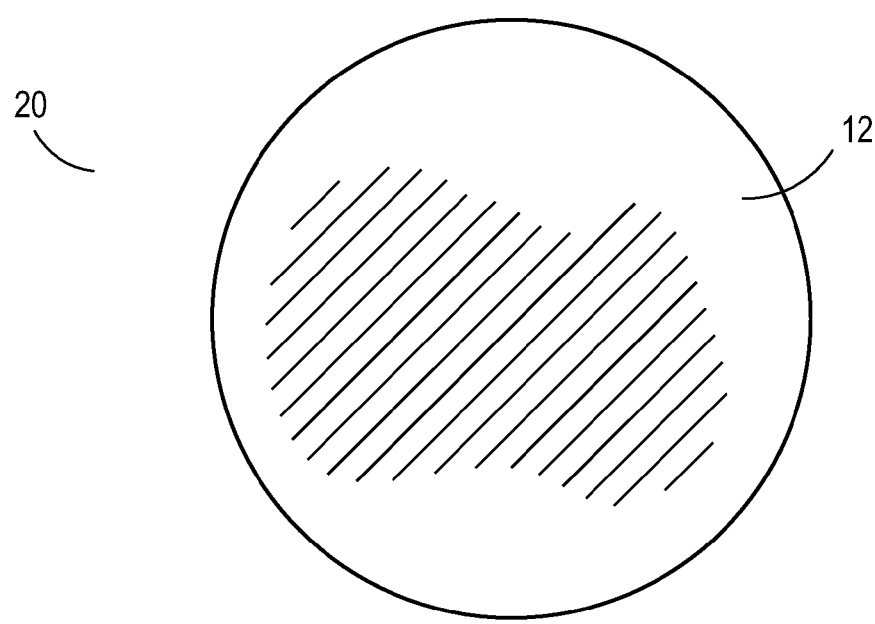
FIG. 8 is a bottom view of the thorn-like vehicle ornament shown in FIG. 5.
Figure 9:
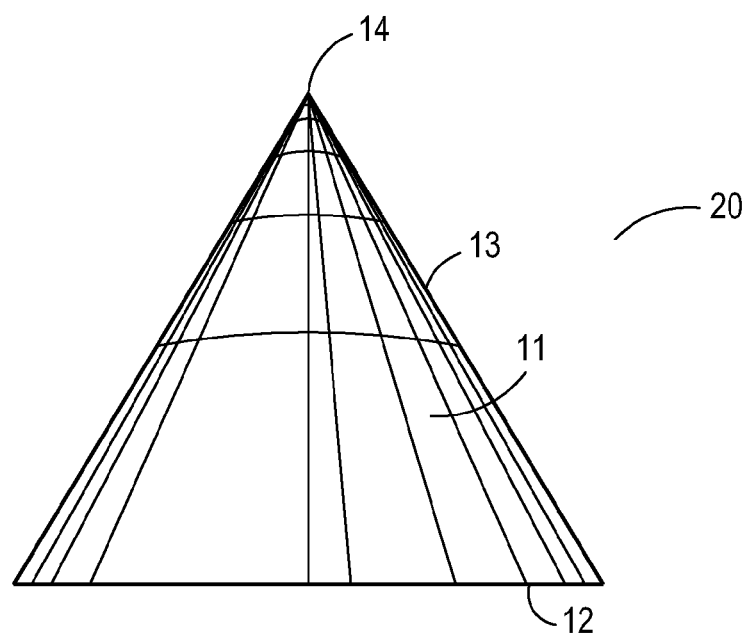
FIG. 9 is a front side view of the thorn-like vehicle ornament shown in FIG. 5.
Figure 10:
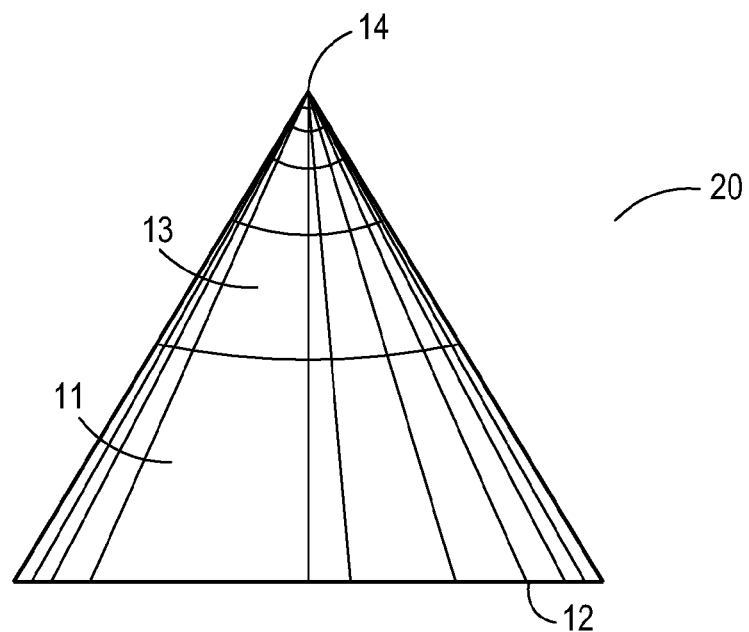
FIG. 10 is a rear side view of the thorn-like vehicle ornament shown in FIG. 5.

7 provides a top view of exemplary vehicle ornament 20. FIG. 8 provides a bottom view of exemplary vehicle ornament 20. FIG. 9 provides a front side view of exemplary vehicle ornament 20. FIG. 10 provides a rear side view of exemplary vehicle ornament 20.

Figure 14:
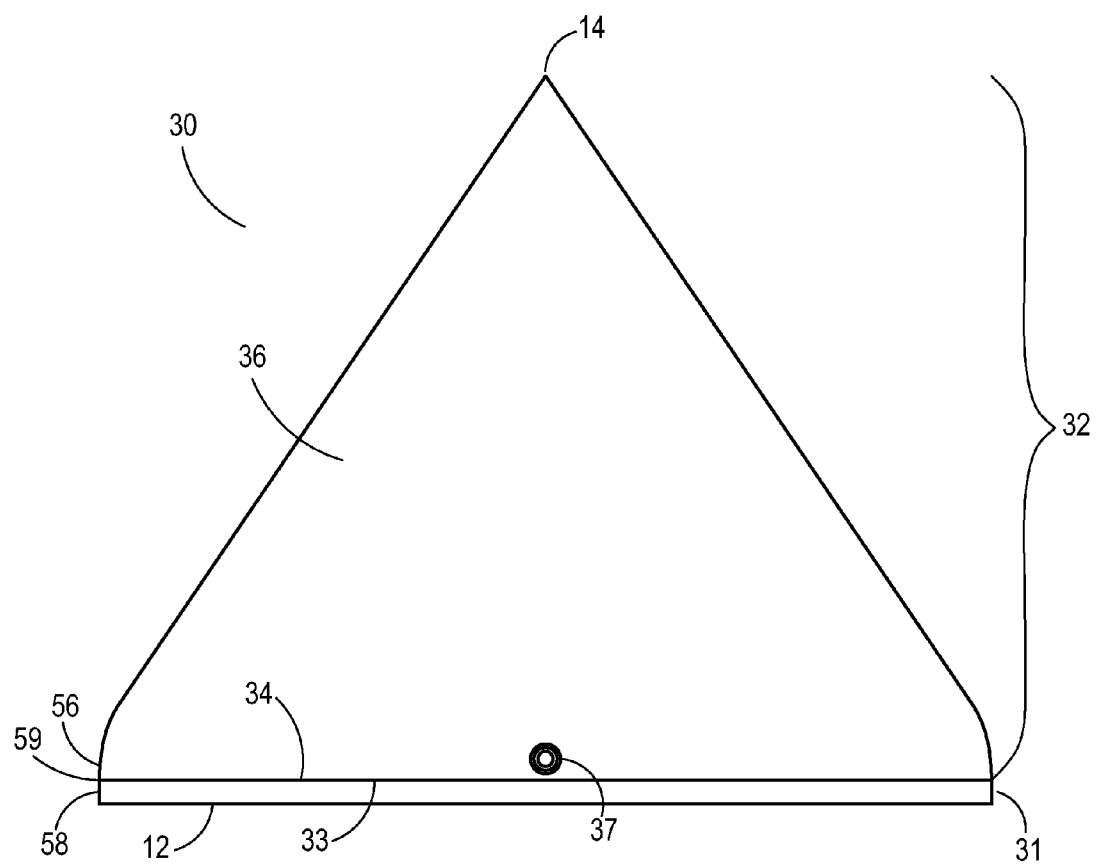
FIG. 14 is a side view of another vehicle ornament.

Other exemplary kits of the present invention may comprise one or more vehicle ornaments, wherein at least one of the vehicle ornaments in the kit comprises a vehicle ornament such as exemplary vehicle ornament 30 shown in FIG. 14. As shown in FIG. 14, exemplary vehicle ornament 30 comprises a multi-component exemplary vehicle ornament comprising a base member 31 and an upper shaped member 32. As discussed below, each base member 31 comprises (i) a substantially flat lower surface 12 that is capable of engaging with an outer surface of a vehicle (not shown), and (ii) an upper base member surface 33. Each upper shaped member 32 comprising (i) a lower surface 34 operatively adapted to engage with upper base member surface 33, (ii) a three-dimensional shape 36 extending above lower surface 34 of upper shaped member 32, and (iii) one or more opposite surfaces or points 14 (e.g., one or more peak points) positioned away from lower surface 34 of upper shaped member 32.

As shown by exemplary vehicle ornaments 10, 20 and 30 in FIGS. 1, 5 and 14 respectively, vehicle ornaments of the present invention may comprise a number of features, three-dimensional shapes, and components. A description of individual vehicle ornaments and methods of using vehicle ornaments is provided below.

I. Vehicle Ornaments

Vehicle ornaments of the present invention may have one of the following configurations.

A. Single-Piece Vehicle Ornaments

Vehicle ornaments of the present invention may comprise single-piece vehicle ornaments, such as exemplary vehicle ornaments 10 and 20 shown in FIGS. 1 and 5. As shown in FIGS. 1 and 5, single-piece vehicle ornaments, such as exemplary vehicle ornaments 10 and 20, comprise (i) a substantially flat lower surface 12 that is capable of engaging with an outer surface of a vehicle (not shown), (ii) a three-dimensional shape 11 extending above substantially flat lower surface 12, and (iii) one or more opposite peak points 14 positioned away from substantially flat lower surface 12.

Single-piece vehicle ornaments may have a variety of three-dimensional shapes. Suitable three-dimensional shapes include, but are not limited to, a cone-like shape, a pyramid-like shape, a thorn-like shape, a crown-like shape, a three-dimensional shape as shown in any of FIGS. 1-14 and 24-30, and any combination thereof.

Single-piece vehicle ornaments may comprise one or more materials. Suitable materials include, but are not limited to, one or more polymeric materials, one or more thermoplastic materials, one or more thermosettable materials, one or more metals, one or more cellulosic materials (e.g., wood), one or more ceramic materials, or any combination thereof.

Single-piece vehicle ornaments may have any desired dimensions that enable attachment of a given vehicle ornament onto an outer surface of a vehicle so that the given vehicle ornament remains on the outer surface of the vehicle during operation. Typically, each vehicle ornament has the following maximum overall dimensions:

largest dimension across the substantially flat lower surface—30.5 centimeters (cm) (12.0 inches (in));

overall height—30.5 cm (12.0 in);

largest length (as measured along the greatest length of a given vehicle ornament from the substantially flat lower surface to a point farthest from the substantially flat lower surface)—61.0 cm (24.0 in); and largest width (as measured at a 90° angle to the greatest length of a given vehicle ornament)—30.5 cm (12.0 in).

Typically, each vehicle ornament has the following overall dimensions:

largest dimension across the substantially flat lower surface—from about 10.2 cm (4.0 in) to about 20.3 cm (8.0 in), more typically, from about 15.2 cm (6.0 in) to about 20.3 cm (8.0 in);

overall height—from about 10.2 cm (4.0 in) to about 20.3 cm (8.0 in), more typically, from about 12.7 cm (5.0 in) to about 17.8 cm (7.0 in);

largest length (as measured along the greatest length of a given vehicle ornament from the substantially flat lower surface to a point farthest from the substantially flat lower surface)—from about 10.2 cm (4.0 in) to about 20.3 cm (8.0 in), more typically, from about 15.2 cm (6.0 in) to about 20.3 cm (8.0 in); and largest width (as measured at a 90° angle to the greatest length of a given vehicle ornament)—from about 10.2 cm (4.0 in) to about 20.3 cm (8.0 in), more typically, from about 15.2 cm (6.0 in) to about 20.3 cm (8.0 in).

B. Multi-Component Vehicle Ornaments

Vehicle ornaments of the present invention may also comprise multi-component vehicle ornaments, such as exemplary vehicle ornament 30 shown in FIG. 14. As shown in FIG. 14, multi-component vehicle ornaments, such as exemplary vehicle ornament 30, comprise a base member 31 and an upper shaped member 32. FIGS. 15-18 provide further details of an exemplary base member 31, while FIGS. 19-22 provide further details of an exemplary upper shaped member 32.

Figure 15:
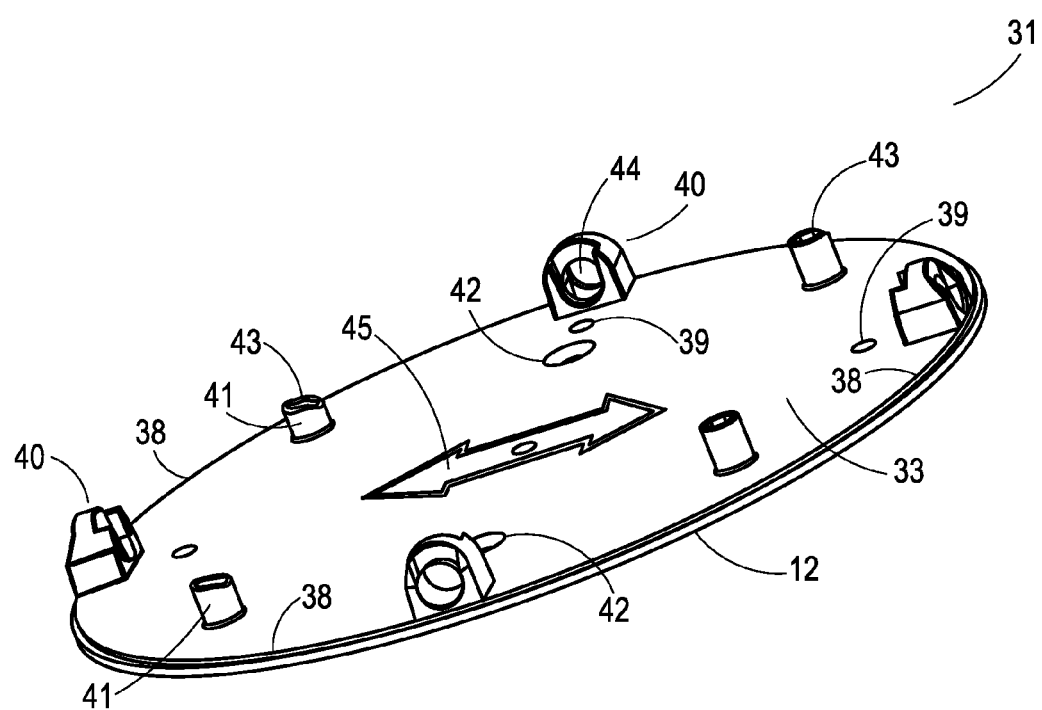
FIG. 15 is a perspective view of an exemplary base member for the exemplary vehicle ornament shown in FIG. 14.

As shown in FIG. 15, exemplary base member 31 may comprise one or more of the following components/features: (i) substantially flat lower surface 12 that is capable of engaging with an outer surface of a vehicle (not shown), (ii) an upper base member surface 33, (iii) an outer periphery 38 of upper base member surface 33, (iv) one or more positioning holes 39 extending from upper base member surface 33 to substantially flat lower surface 12, (v) one or more screw holes 42 extending from upper base member surface 33 to substantially flat lower surface 12, (vi) one or more outer engagement members 40 extending upward from upper base member surface 33, (vii) one or more inner engagement members 41 extending upward from upper base member surface 33; (viii) one or more outer engagement member holes 44 extending thru one or more outer engagement members 40, (ix) one or more inner engagement member holes 43 extending into at least a portion of one or more inner engagement members 41; and (x) one or more directional arrows 45 positioned along upper base member surface 33.

Exemplary base member 31 comprise five positioning holes 39 extending from upper base member surface 33 to substantially flat lower surface 12, two screw holes 42 extending from upper base member surface 33 to substantially flat lower surface 12, four outer engagement members 40 extending upward from upper base member surface 33, four inner engagement members 41 extending upward from upper base member surface 33, four outer engagement member holes 44 extending thru the four outer engagement members 40, four inner engagement member holes 43 extending into at least a portion of the four inner engagement members 41; and one directional arrow 45 positioned along upper base member surface 33.

It should be noted that a given exemplary upper shaped member 32 may be attached to exemplary base member 31 in four different positions represented by the four outer engagement members 40. In other words, an upper shaped member 32 having a thorn-like shape, such as exemplary vehicle ornament 20 shown in FIG. 5, could be attached to exemplary upper shaped member 32 so that peak point 14 faces either direction as shown by direction arrow 45 or either direction perpendicular to direction arrow 45. If, for example, a given base member comprise three outer engagement members 40 extending upward from upper base member surface 33, a corresponding upper shaped member is desirably positionable in three different positions represented by the three outer engagement members 40.

Figure 16:
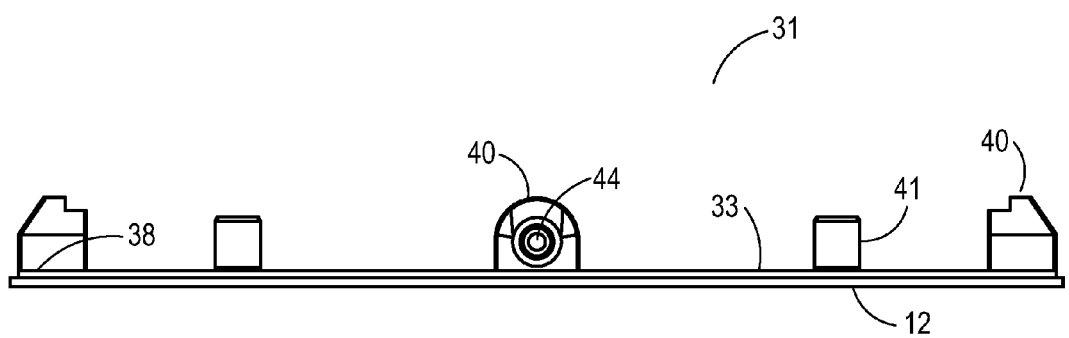
FIG. 16 is a side view of the exemplary base member shown in FIG. 15.
Figure 17:
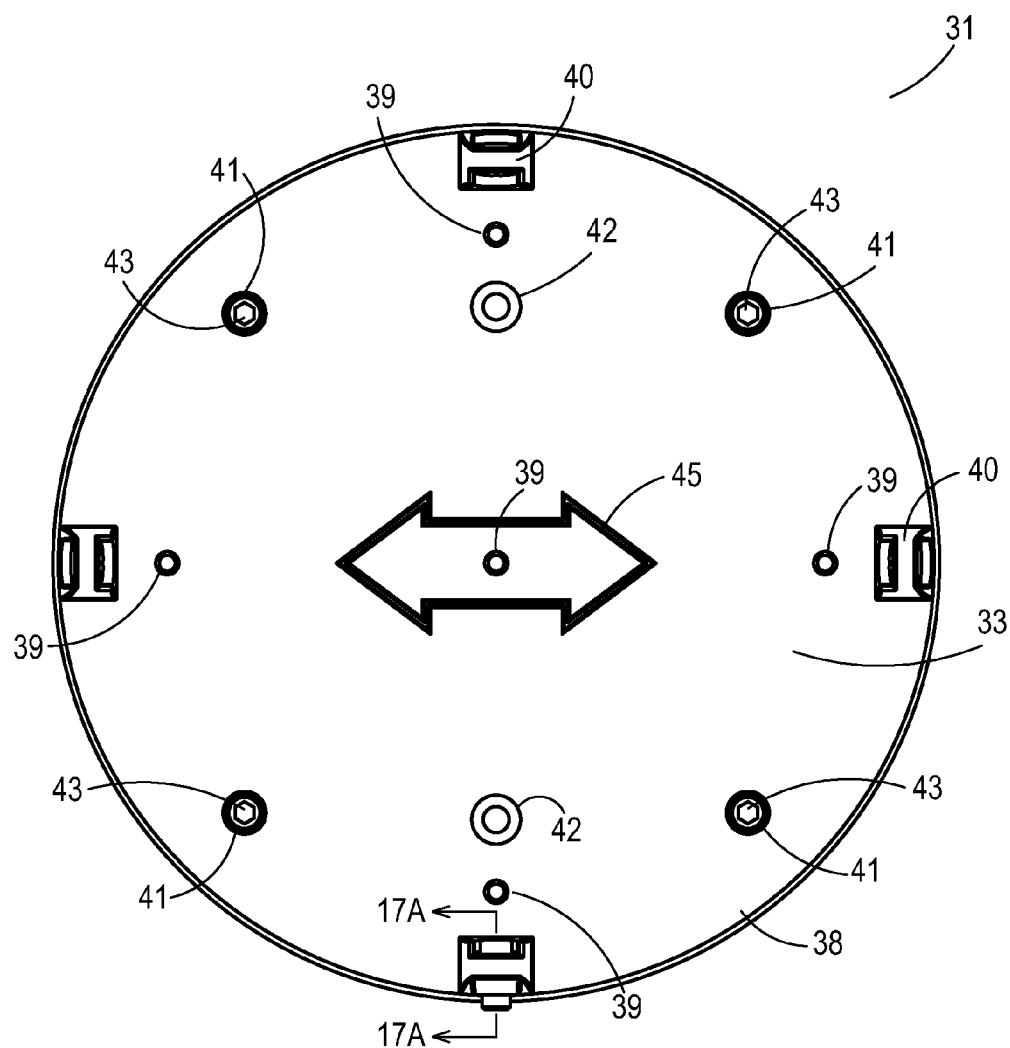
FIG. 17 is a top view of the exemplary base member shown in FIG. 15.
Figure 17A:
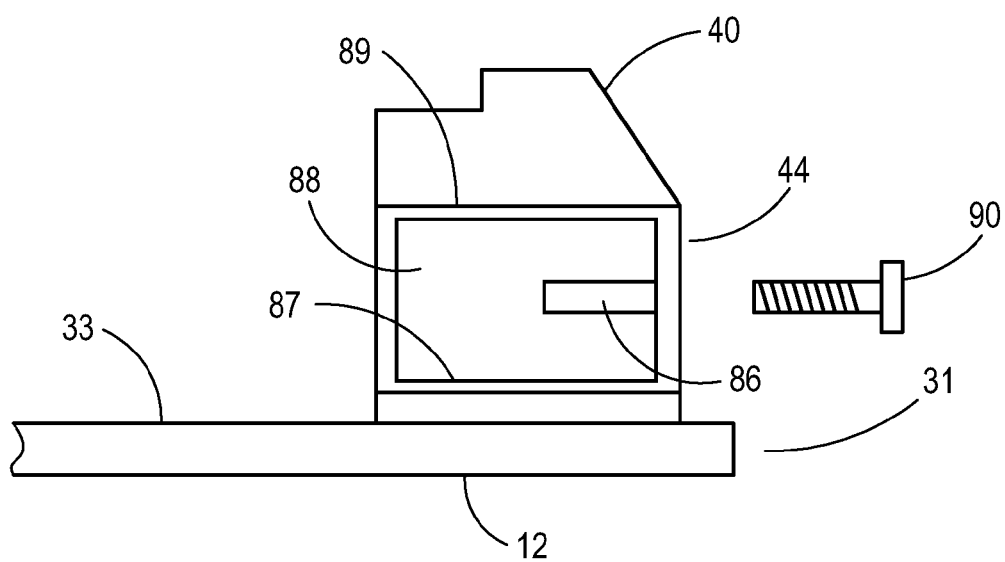
FIG. 17a is a cross-sectional view along line A-A shown in FIG. 17.

FIG. 16 provides a side view of exemplary base member 31 shown in FIG. 15, while FIG. 17 provides a top view of exemplary base member 31 shown in FIG. 15. FIG. 17a provides a cross-sectional view along line A-A shown in FIG. 17.

As shown in FIG. 17a, in some embodiments, one or more removable inserts 88 may be used in combination with outer engagement members 40 to secure a given upper shaped member to a base member. In this exemplary embodiment, a removable insert 88 is inserted into each outer engagement member hole 44 and engages with an inner surface 89 of outer engagement member hole 44 or some other portion of outer engagement member 40. For example, an outer threaded surface 87 of a given removable insert 88 may engage with corresponding threads (not shown) along be inner surface 89 of outer engagement member hole 44. In other embodiments, a given removable insert 88 may engage with a stop (not shown) within outer engagement member hole 44 that prevents the removable insert 88 from moving toward outer periphery 38 of upper base member surface 33.

When one or more removable inserts 88 are used, each screw 90 extends thru a corresponding engaging hole 37 extending from an outer surface 56 of a three-dimensional shape 36 to an inner surface 51 of the three-dimensional shape 36 (see, FIG. 19) and into insert channel 86 of a given removable insert 88.

In other embodiments, removable inserts 88 are not necessary given that each outer engagement member 40 is configured (e.g., molded) so as to directly receive screw 90. In these embodiments, each screw 90 extends thru a corresponding engaging hole 37 extending from an outer surface 56 of a three-dimensional shape 36 to an inner surface 51 of the three-dimensional shape 36 (see, FIG. 19) and directly into an outer engagement member hole 44 of a given outer engagement member 40 so as to engage with an inner surface (not shown) of an outer engagement member hole 44.

Figure 18:
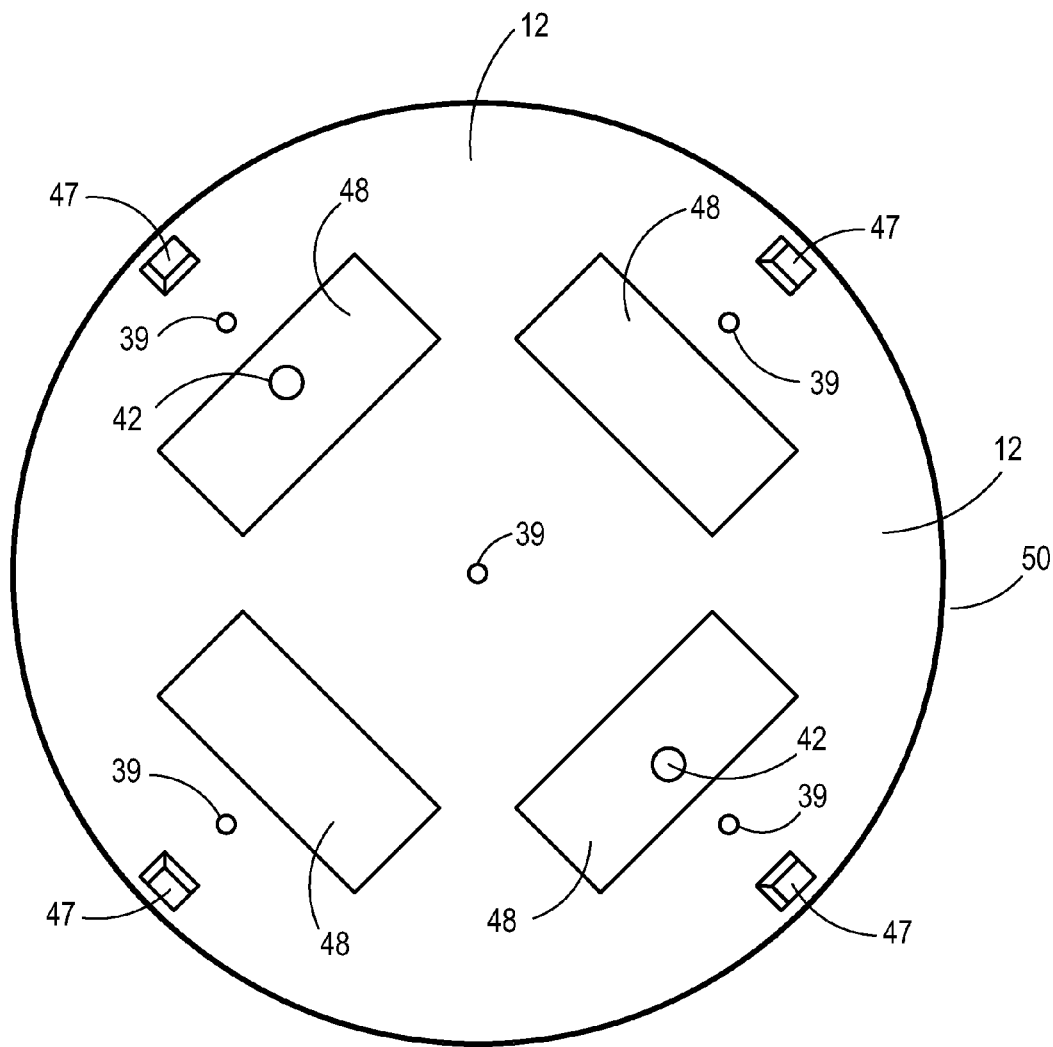
FIG. 18 is a bottom view of the exemplary base member shown in FIG. 15.

FIG. 18 provides a bottom view of exemplary base member 31 shown in FIG. 15. As shown in FIG. 18, in some embodiments, the base member may comprise recessed areas 48 positioned within substantially flat lower surface 12, and typically within an interior portion of substantially flat lower surface 12 away from edge 50. It should be understood that although exemplary recessed areas 48 are shown as having a rectangular shape, recessed areas within substantially flat lower surface 12, such as exemplary recessed areas 48, may have any shape (e.g., circular, triangular, square, etc.).

It should be further noted that any of the disclosed vehicle ornaments of the present invention may comprise recessed areas such as exemplary recessed areas 48 shown in FIG. 18. For example, any of exemplary vehicle ornaments 10 and 20 may further comprise one or more recessed area positioned along and within at least a portion of substantially flat lower surface 12.

FIG. 18 also depicts an inner portion 47 of outer engagement members 40 (extending into the page as shown in FIG. 18). Inner portion 47 may be present when a given base member is formed via a molding step, such as an injection molding step.

Figure 19:
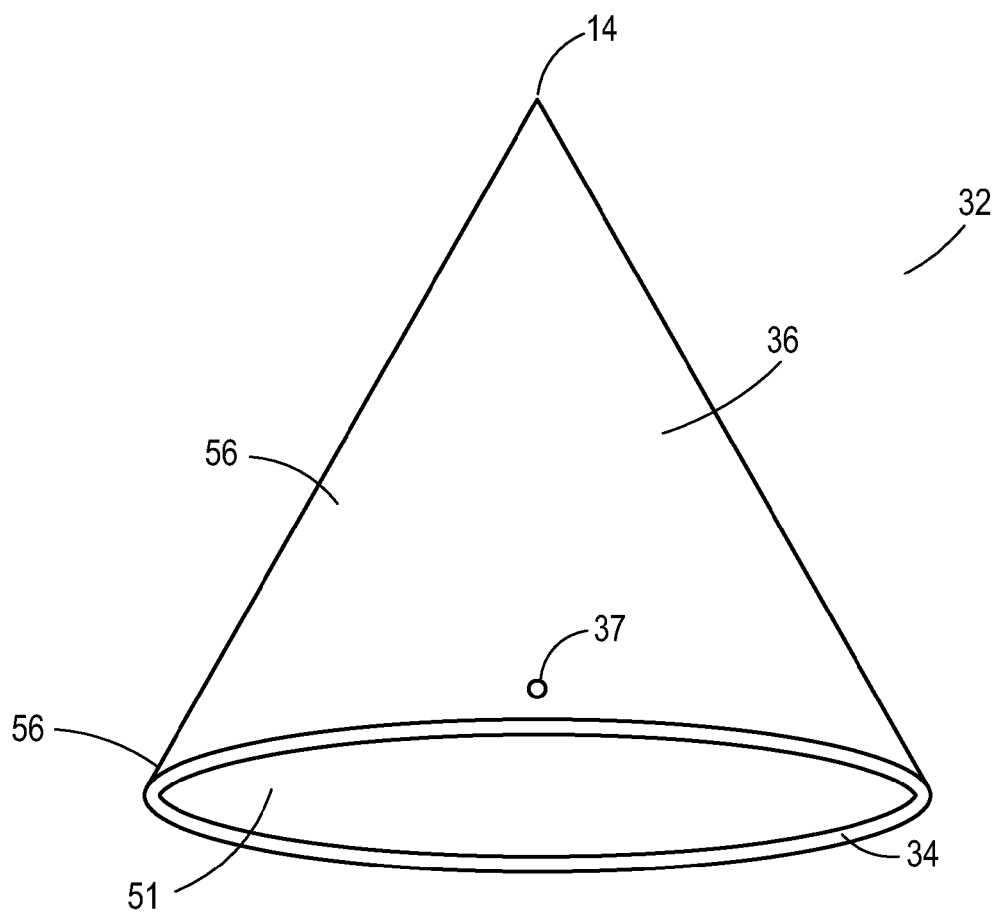
FIG. 19 is a perspective view of an exemplary upper shaped member for the exemplary vehicle ornament shown in FIG. 14.

As discussed above, multi-component vehicle ornaments, such as exemplary vehicle ornament 30, also comprise an upper shaped member. FIG. 19 depicts exemplary upper shaped member 32. As shown in FIG. 19, exemplary upper shaped member 32 comprises (i) lower surface 34 operatively adapted to engage with at least a portion of upper base member surface 33, (ii) three-dimensional shape 36 extending above lower surface 34 of upper shaped member 32, and (iii) one or more opposite surfaces or points 14 positioned away from lower surface 34 of upper shaped member 32.

Exemplary upper shaped member 32 also comprises an inner surface 51 extending within three-dimensional shape 36 toward one or more opposite surfaces or points 14. In some embodiments, such as in exemplary upper shaped member 32, inner surface 51 extends within three-dimensional shape 36 to an inner area proximate one or more opposite surfaces or points 14 (i.e., three-dimensional shape 36 is substantially hollow). In other exemplary embodiments (not shown), inner surface 51 extends a short distance within three-dimensional shape 36 to an inner area proximate the height of outer engagement members 40 discussed above (i.e., three-dimensional shape 36 is substantially solid).

Exemplary upper shaped member 32 further comprises one or more engaging hole 37 extending into outer surface 56 of three-dimensional shape 36. In some exemplary embodiments, such as in exemplary upper shaped member 32, one or more engaging hole 37 extend from outer surface 56 of three-dimensional shape 36 to inner surface 51 of three-dimensional shape 36.

Figure 20:
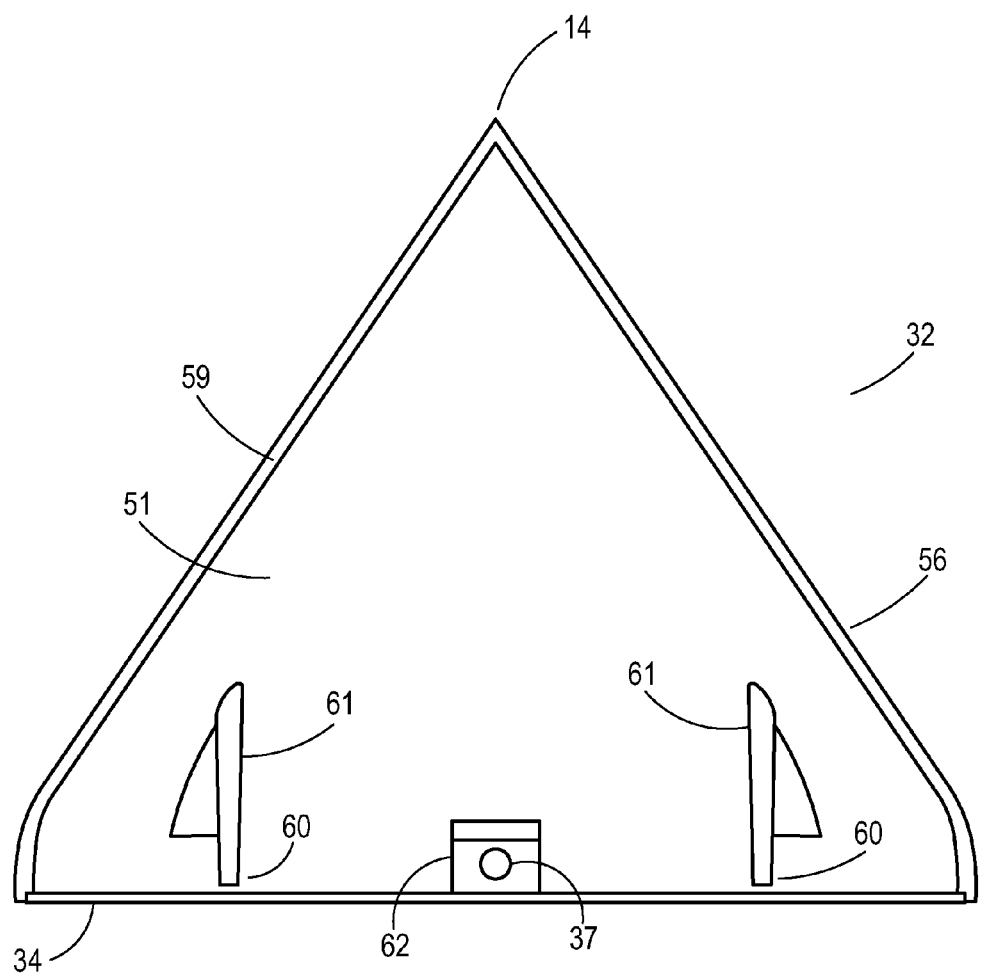
FIG. 20 is a cross-sectional view of the exemplary upper shaped member shown in FIG. 19.

FIG. 20 provides a cross-sectional view of exemplary upper shaped member 32 shown in FIG. 19. As shown in FIG. 20, exemplary upper shaped member 32 further comprises (i) side wall 59 extending between outer surface 56 and inner surface 51, (ii) a thickened side wall section 62 of side wall 59 extending around each engaging hole 37, (iii) one or more inner engagement members 61 extending from inner surface 51, and (iv) engaging posts 60 extending downward from inner engagement members 61.

In some exemplary embodiments, one or more engaging posts 60 of inner engagement members 61 extend into (and desirably snugly fit therein) one or more inner engagement member holes 43 of one or more inner engagement members 41 (discussed above) to engage an upper shaped member, such as exemplary upper shaped member 32, to a base member, such as exemplary base member 31. It should be noted that (i) one or more engaging posts 60 of inner engagement members 61 and (ii) one or more inner engagement member holes 43 of one or more inner engagement members 41 may each have any desired corresponding cross-sectional configuration (e.g., circular, triangular, square, star-shaped, etc.) so as to snugly engage with one another.

In addition, screws (not shown) may be used to further engage an upper shaped member, such as exemplary upper shaped member 32, to a base member, such as exemplary base member 31 by inserting one or more screws thru one or more engaging holes 37 (and thickened side wall sections 62) of an upper shaped member, such as exemplary upper shaped member 32, and one or more corresponding outer engagement member holes 44 extending thru one or more outer engagement members 40 of a given base member.

Figure 21:
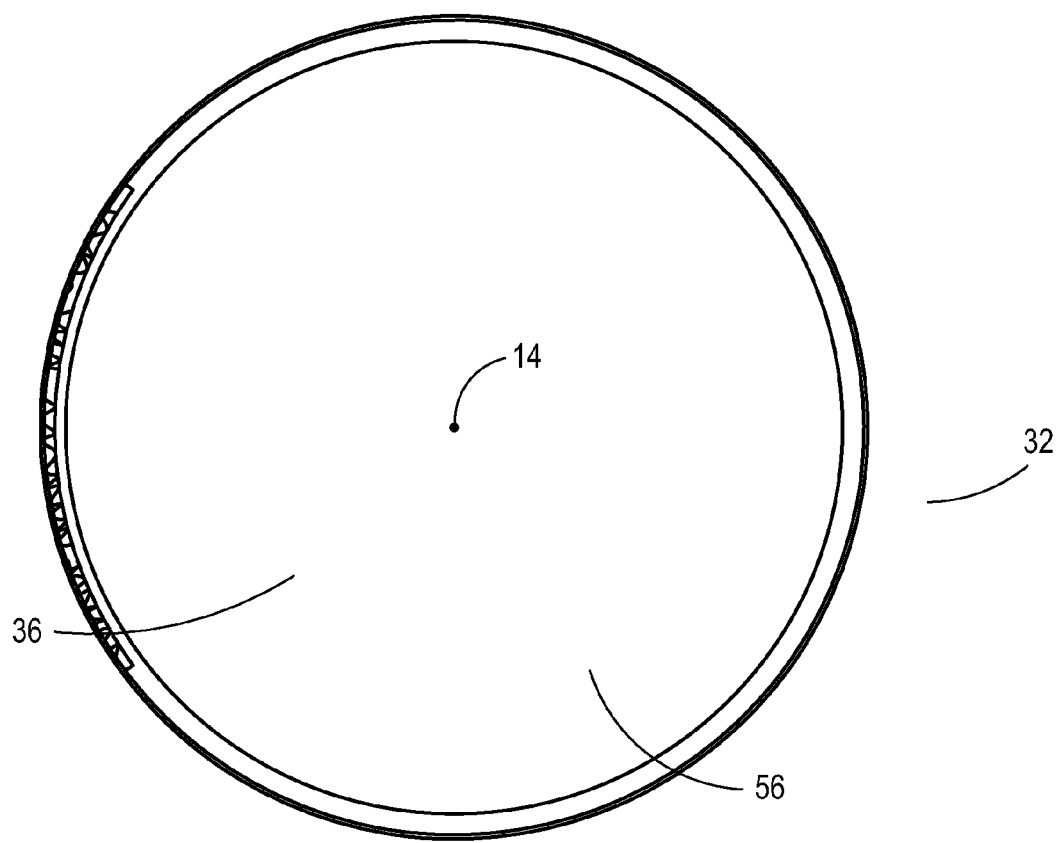
FIG. 21 is a top view of the exemplary upper shaped member shown in FIG. 19.
Figure 22:
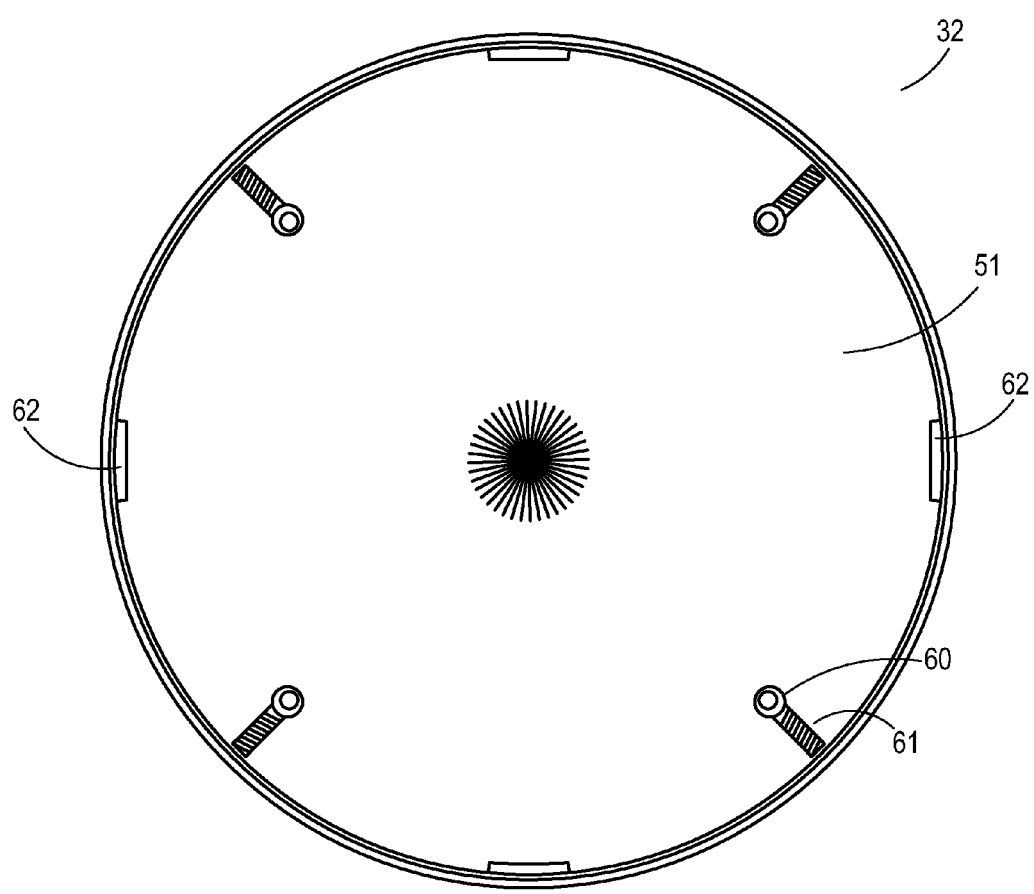
FIG. 22 is a bottom view of the upper shaped member shown in FIG. 19.

FIG. 21 provides a top view of exemplary upper shaped member 32. FIG. 22 provides a bottom view of exemplary upper shaped member 32.

In some exemplary embodiments, the base member and the upper shaped member of a given multi-component vehicle ornament connect with one another so as to form a substantially smooth transition from an outer side surface of the base member to an outer side surface of the upper shaped member. Such an embodiment is shown in FIG. 14. As shown in FIG. 14, outer surface 56 of exemplary upper shaped member 32 abuts outer surface 58 of exemplary base member 31 so as to form a seam 59. Desirably, seam 59 has a minimal width (i.e., outer surface 56 of exemplary upper shaped member 32 and outer surface 58 of exemplary base member 31 abut one another along a complete periphery of both exemplary upper shaped member 32 and exemplary base member 31). In some desired embodiments, outer surface 56 of exemplary upper shaped member 32 and outer surface 58 of exemplary base member 31 abut one another along a complete periphery of both exemplary upper shaped member 32 and exemplary base member 31 so that seam 59 is visually indiscernible.

In yet a further embodiment, a given multi-component vehicle ornament may comprise a base member as described above (e.g., exemplary base member 31 shown in FIG. 15), an upper shaped member as described above (e.g., exemplary upper shaped member shown in FIG. 19), and an intermediate shaped member positioned between the base member and the upper shaped member. An exemplary intermediate shaped member 320 is shown in FIG. 23.

Figure 23:
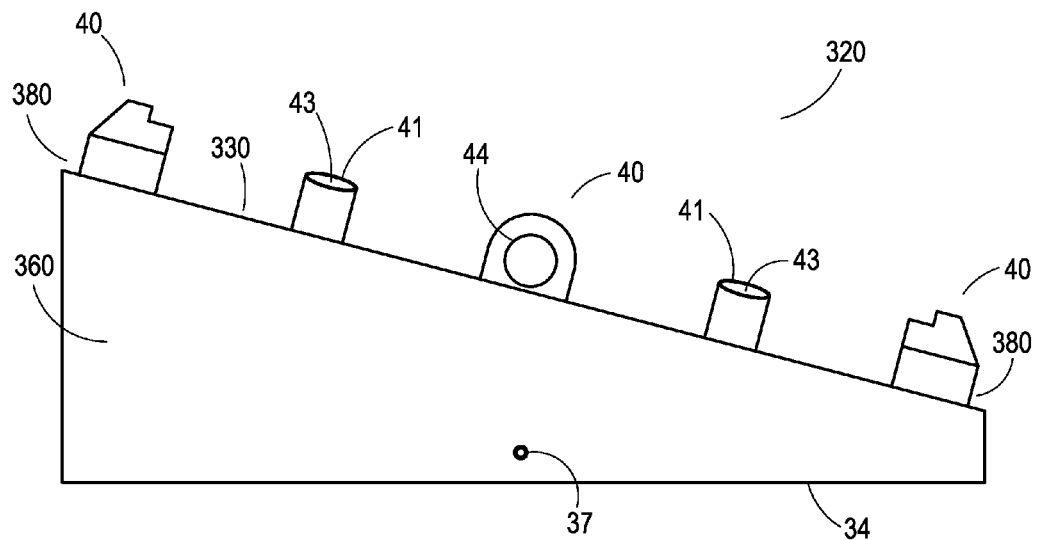
FIG. 23 depicts an intermediate member suitable for positioning between the exemplary base member shown in FIG. 15 and the exemplary upper shaped member shown in FIG. 19 so as to change the position of the exemplary upper shaped member relative to the exemplary base member.
Figure 24:
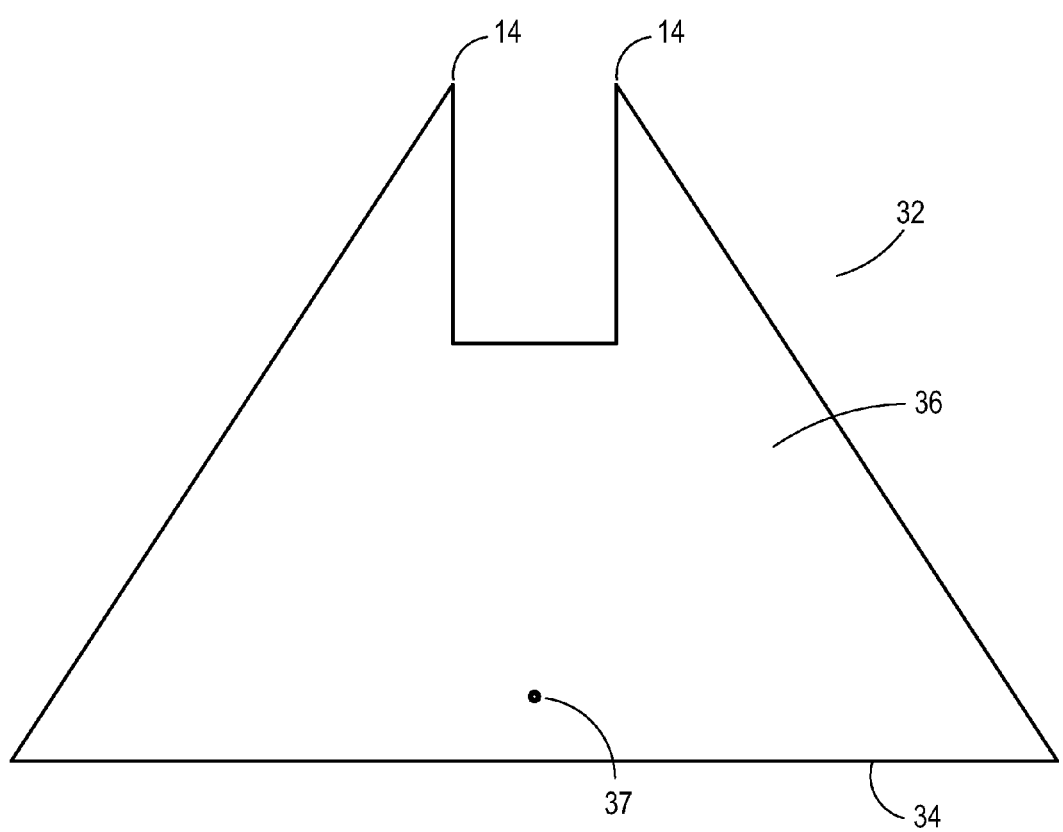
FIGS. 24-30 depict various exemplary three-dimensional shapes for upper shaped members and/or vehicle ornaments of the present invention.
Figure 25:
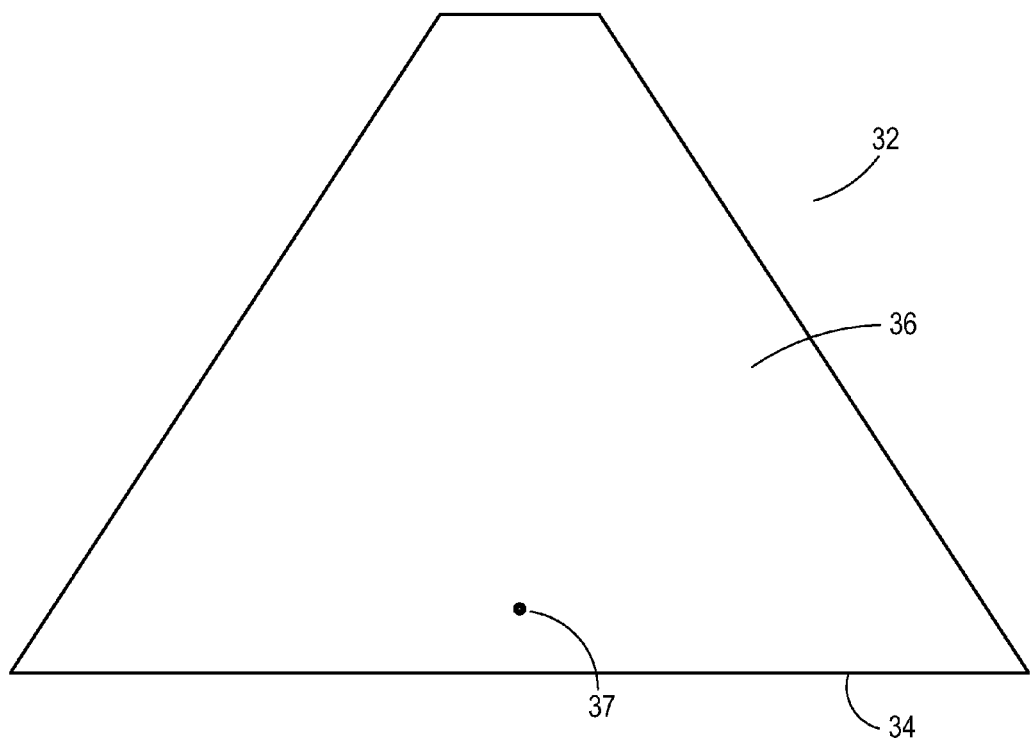
Figure 26:
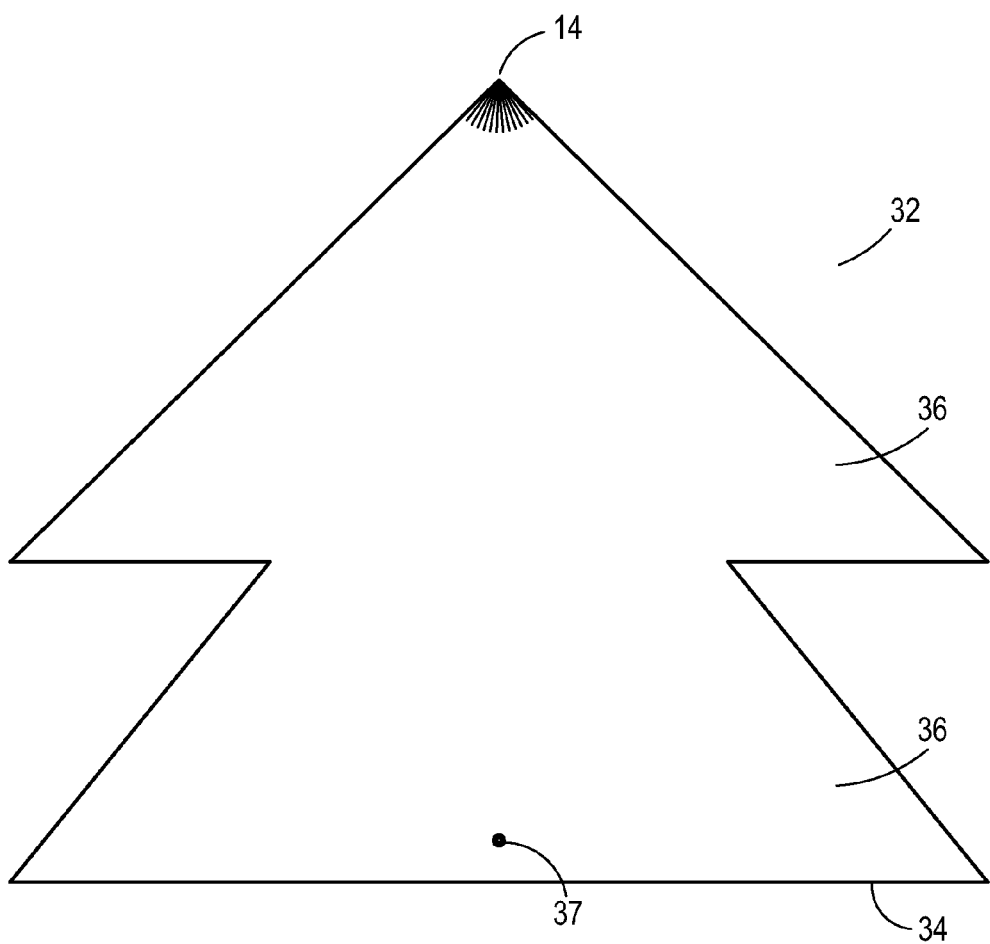
Figure 27:
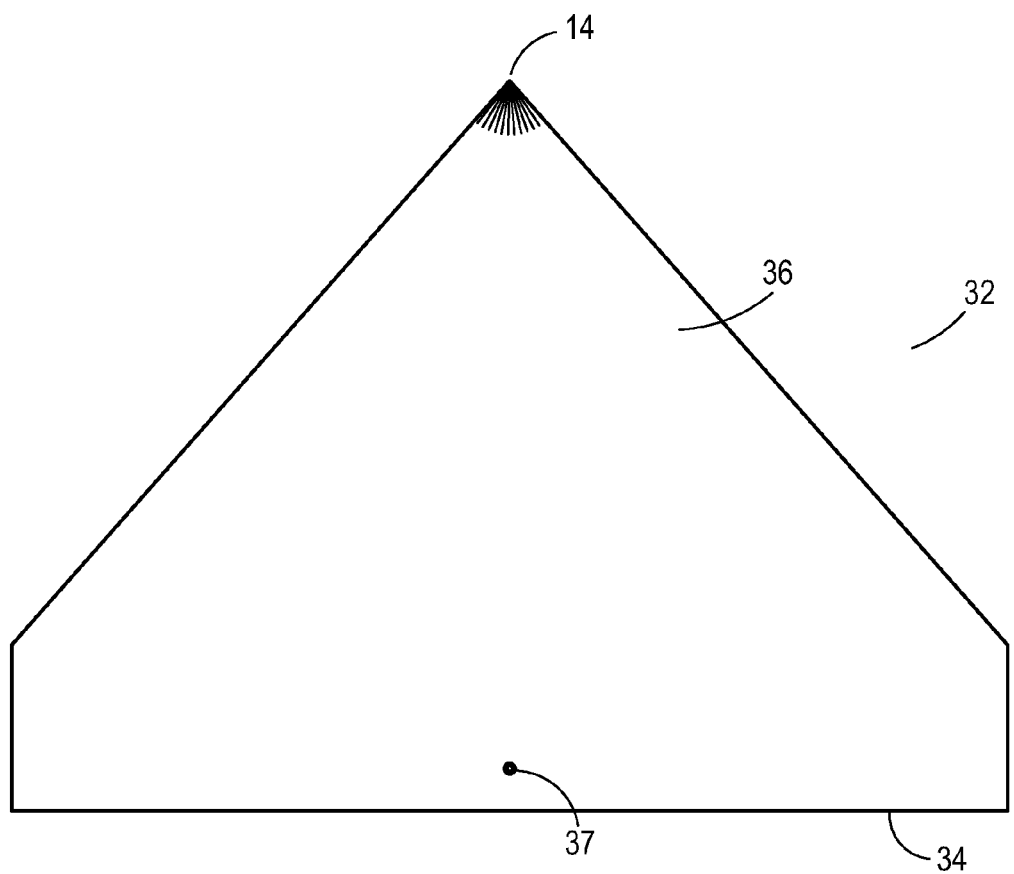
Figure 28:
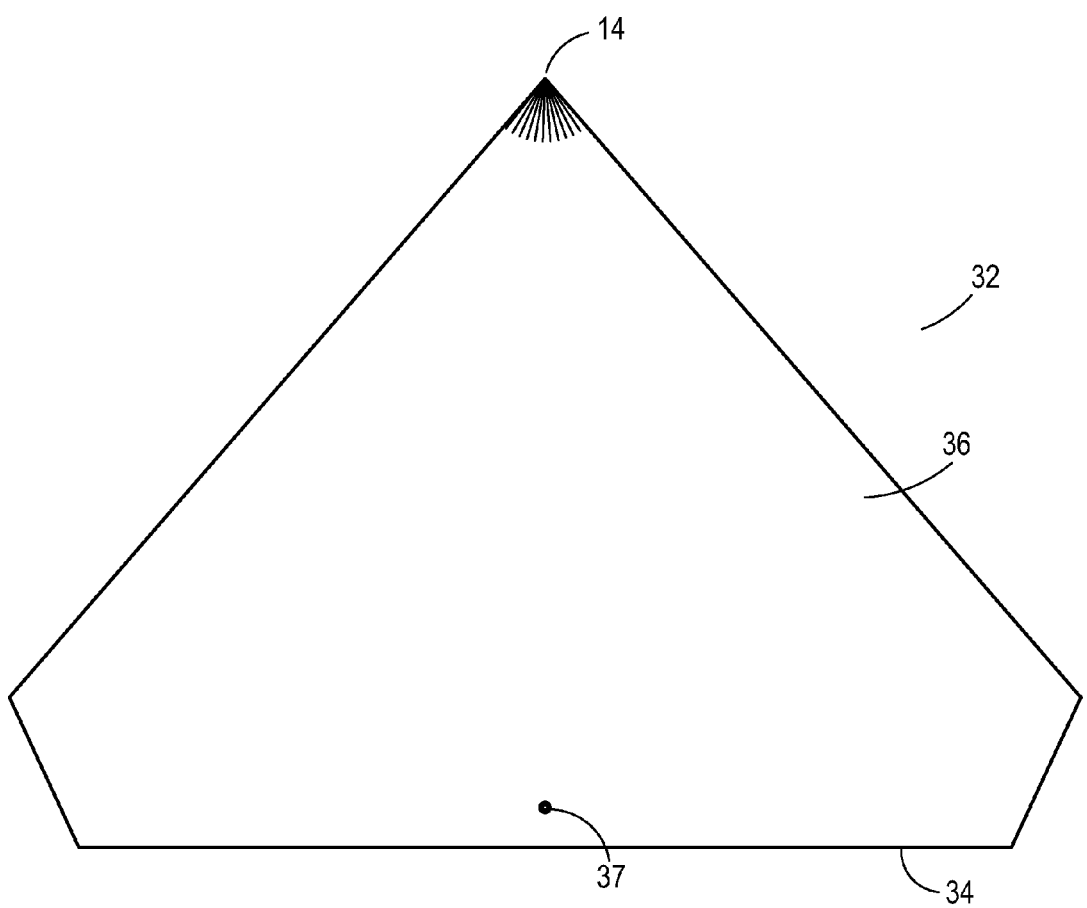
Figure 29:
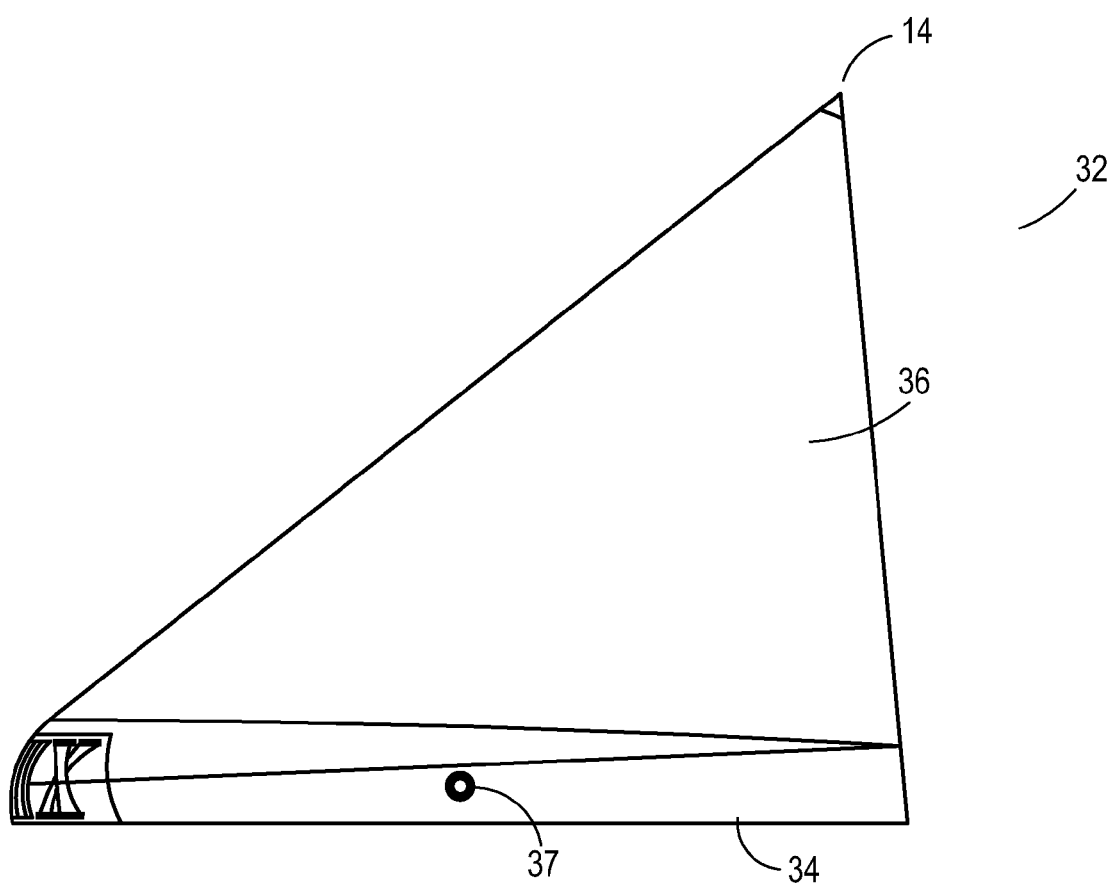
Figure 30:
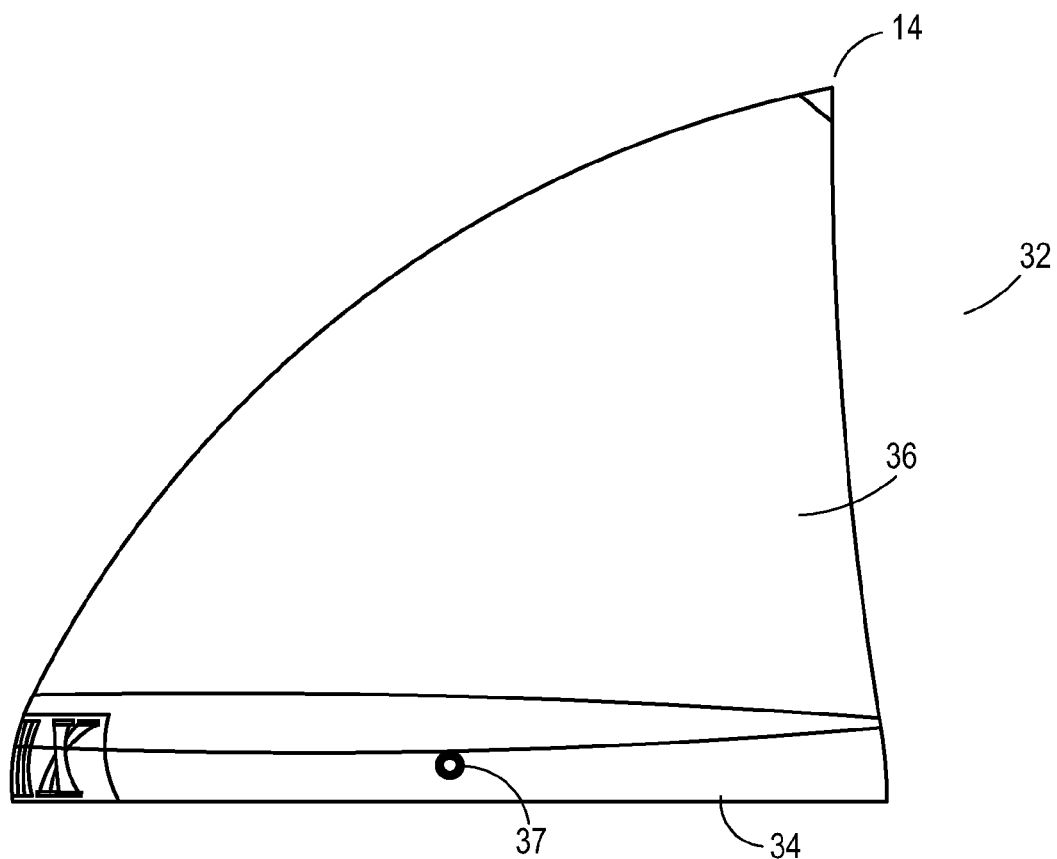

As shown in FIG. 23, exemplary intermediate shaped member 320 comprises a wedge-shaped three-dimensional shape having (i) lower surface 34 operatively adapted to engage with at least a portion of an upper base member surface (e.g., upper base member surface 33) of a base member (e.g., exemplary base member 31 shown in FIG. 15), (ii) three-dimensional shape 360 extending above lower surface 34 of intermediate shaped member 320, (iii) an upper intermediate shaped member surface 330, and (iv) one or more engaging hole 37 for connection of extending exemplary intermediate shaped member 320 to an upper base member surface (e.g., upper base member surface 33) of a base member (e.g., exemplary base member 31).

As shown in FIG. 23, exemplary intermediate shaped member 320 further comprises features similar to those on a given base member, namely, one or more of the following components/features: (i) an outer periphery 380 of upper intermediate shaped member surface 330, (ii) one or more outer engagement members 40 extending upward from upper intermediate shaped member surface 330, (iii) one or more inner engagement members 41 extending upward from upper intermediate shaped member surface 330; (iv) one or more outer engagement member holes 44 extending thru one or more outer engagement members 40, and (v) one or more inner engagement member holes 43 extending into at least a portion of one or more inner engagement members 41.

Exemplary intermediate shaped member 320 and other similar intermediate shaped members enable a user to further modify multi-component vehicle ornaments of the present invention as desired. For example, exemplary intermediate shaped member 320 allows a user to tilt a given upper shaped member in a desired direction.

Similar to the single-piece vehicle ornaments discussed above, multi-component vehicle ornaments of the present invention may have a variety of three-dimensional shapes. Suitable three-dimensional shapes include, but are not limited to, any of the above-mentioned shapes or combinations of shapes described above for single-piece vehicle ornaments. In addition, as with the single-piece vehicle ornaments discussed above, multi-component vehicle ornaments of the present invention may comprise one or more materials including, but are not limited to, any of the above-mentioned materials or combinations of materials for single-piece vehicle ornaments.

Typically, the multi-component ornaments of the present invention have maximum overall dimensions and overall dimension ranges similar to those discussed above with reference to the single-piece vehicle ornaments.

II. Kits Containing One or More Vehicle Ornaments

Kits of the present invention may comprise any combination of vehicle ornament components (e.g., one or more base members, one or more upper shaped members, etc.), vehicle ornaments, and additional kit components as described below.

A. Vehicle Ornaments

Kits of the present invention may comprise one or more of the above-described vehicle ornaments. For example, some kits may comprise one or more (or two or more) single-piece vehicle ornaments. Other kits may comprise one or more (or two or more) single-piece vehicle ornaments, wherein each single-piece vehicle ornament in the kit has a substantially similar shape (e.g., all of the single-piece vehicle ornaments in the kit have a cone-like shape). Other kits may comprise two or more single-piece vehicle ornaments, wherein at least two single-piece vehicle ornaments in the kit have different shapes (e.g., at least one single-piece vehicle ornament in the kit has a cone-like shape and at least one other single-piece vehicle ornament in the kit has a thorn-like shape).

Other kits of the present invention may comprise components (e.g., at least one base member, and at least one upper shaped member) to form at least one vehicle ornament, wherein each vehicle ornament is sized and operatively adapted to attach to an outer surface of a vehicle. An exemplary kit comprises (I) at least one base member, wherein each base member comprises (i) a substantially flat lower surface (e.g., substantially flat lower surface 12) that is capable of engaging with the outer surface of a vehicle, and (ii) an upper base member surface (e.g., upper base member surface 33), and (II) two or more upper shaped members (e.g., two or more exemplary upper shaped members 32 or other upper shaped members), wherein each upper shaped member comprises (i) a lower surface (e.g., lower surface 34) operatively adapted to engage with the upper base member surface (e.g., upper base member surface 33), (ii) a three-dimensional shape (e.g., three-dimensional shape 36) extending above the lower surface of the upper shaped member, and (iii) one or more opposite surfaces or points (e.g., peak points 14) positioned away from the lower surface of the upper shaped member.

In some kits, the kit comprises at least one base member and at least two upper shaped members, wherein at least two of the upper shaped members (i) differ from one another in overall shape (e.g., a cone shape versus a thorn shape), and (ii) are exchangeable with one another so as to be attachable to a given base member within the kit. In other kits, the kit comprises (I) two or more base members, and (II) a greater number of upper shaped members, wherein at least two of the upper shaped members (i) differ from one another in overall shape (e.g., a cone shape versus a thorn shape), and (ii) are exchangeable with one another so as to be attachable to a given base member.

Other kits may comprise at least one base member, at least one intermediate shaped member, and at least one upper shaped member. For example, an exemplary kit may comprise at least one base member, at least one intermediate shaped member, and at least one upper shaped member, wherein at least two of the upper shaped members (i) differ from one another in overall shape (e.g., a cone shape versus a thorn shape), and (ii) are exchangeable with one another so as to be attachable to any base member, any intermediate shaped member, or both within the kit. In other kits, the kit comprises (I) two or more base members, (II) two or more intermediate shaped members, and (III) a greater number of upper shaped members, wherein at least two of the upper shaped members (i) differ from one another in overall shape (e.g., a cone shape versus a thorn shape), and (ii) are exchangeable with one another so as to be attachable to any base member, any intermediate shaped member, or both within the kit.

B. Additional Kit Components

Kits of the present invention may further comprise one or more of the following kit components:

(1) double-sided adhesive tape for attaching a lower surface of a given vehicle ornament to the outer surface of a vehicle;

(2) a set of first screws sized to extend through a portion of each of the complementary engagement members (i.e., thru outer engagement members 40 of exemplary base member 31 and thickened side wall section 62 of exemplary upper shaped member 32) and corresponding bolts as needed;

(3) a set of second screws and corresponding bolts for attaching a lower surface of a given vehicle ornament to the outer surface of a vehicle;

(4) one or more removable inserts (e.g., removable insert 88 shown in FIG. 17a);

(5) one or more magnets for attaching a lower surface of a given vehicle ornament to the outer surface of a vehicle;

(6) a paint or detailing sub-kit for providing paint, adhesive film, or some other decorative article on a given vehicle ornament; and (7) surface cleaner for cleaning an outer surface of a vehicle prior to, during and/or after the step of attaching a vehicle ornament to the outer vehicle surface.

III. Methods of Making Vehicle Ornaments

The present invention is further directed to methods of making vehicle ornaments capable of engaging with an outer surface of a vehicle. In some exemplary embodiments, the method of making a vehicle ornament comprises forming a material into one or more vehicle ornaments, wherein each vehicle ornament comprises (i) a substantially flat lower surface that is capable of engaging with an outer surface of a vehicle, (ii) a three-dimensional shape extending above the substantially flat lower surface, and (iii) one or more opposite peak points positioned away from the substantially flat lower surface.

In some exemplary embodiments, the forming step may comprise a single forming step so as to form single-piece vehicle ornaments as described above. In other exemplary embodiments, the forming step may comprise (I) forming a base member comprising (i) a substantially flat lower surface that is capable of engaging with the outer surface of a vehicle, and (ii) an upper base member surface; and (II) forming an upper shaped member comprising (i) a lower surface operatively adapted to engage with the upper base member surface, (ii) a three-dimensional shape extending above the lower surface of the upper shaped member, and (iii) one or more opposite surfaces or points (e.g., one or more peak points) positioned away from the lower surface of the upper shaped member so as to form a multi-component vehicle ornament as described above. In yet other exemplary embodiments, the forming step may further comprise forming an intermediate shaped member comprising (i) a substantially flat lower surface that is capable of engaging with a base member, and (ii) an upper intermediate shaped member surface having surface features as described above.

Any conventional forming step may be used to form the vehicle ornaments of the present invention. Suitable forming steps include, but are not limited to, thermoforming steps (e.g., injection molding, blow molding, etc.), stamping steps, and any other molding step.

One or more forming steps may be used to form any of the three dimensionally shaped components used to form vehicle ornaments of the present invention. As discussed above, vehicle ornaments and components used to form vehicle ornaments (i.e., upper shaped members) may have any three-dimensional shape. FIGS. 24-30 depict various possible three-dimensional shapes for upper shaped members (or single-piece vehicle ornaments) of the present invention.

IV. Methods of Using Vehicle Ornaments and Kits

The present invention is further directed to methods of using vehicle ornaments and kits containing the same. In one exemplary method, the method comprises a method of using vehicle ornaments to modify the look (i.e., appearance) of a vehicle. In some exemplary embodiments, the method of using vehicle ornaments comprises a method of modifying a vehicle (e.g., a car or a truck) comprising attaching one or more similar vehicle ornaments or two or more different vehicle ornaments onto an outer surface of the vehicle.

In some exemplary embodiments, the step of attaching one or more vehicle ornaments onto an outer surface of the vehicle may comprises, for example, bonding or attaching a substantially flat lower surface (e.g., exemplary substantially flat lower surface 12) of each vehicle ornament to the outer surface of the vehicle. In other exemplary embodiments, the step of attaching a given vehicle ornament onto an outer surface of the vehicle may comprise, for example, bonding or attaching a substantially flat lower surface (e.g., exemplary substantially flat lower surface 12) of a base member (e.g., exemplary base member 31) of the vehicle ornament to the outer surface of the vehicle; and bonding or attaching an upper shaped member (e.g., exemplary upper shaped member 32) to the upper base member surface (e.g., exemplary upper base member surface 33) of the base member (e.g., exemplary base member 31).

In other exemplary embodiments, the step of attaching a given vehicle ornament onto an outer surface of the vehicle may comprise, for example, bonding or attaching a substantially flat lower surface (e.g., exemplary substantially flat lower surface 12) of a base member (e.g., exemplary base member 31) of the vehicle ornament to the outer surface of the vehicle; bonding or attaching an intermediate shaped member (e.g., exemplary intermediate shaped member 320) to the upper base member surface (e.g., exemplary upper base member surface 33) of the base member (e.g., exemplary base member 31); and bonding or attaching an upper shaped member (e.g., exemplary upper shaped member 32) to the upper intermediate shaped member surface (e.g., exemplary upper intermediate shaped member surface 330) of the intermediate shaped member (e.g., exemplary intermediate shaped member 320).

Figure 11:
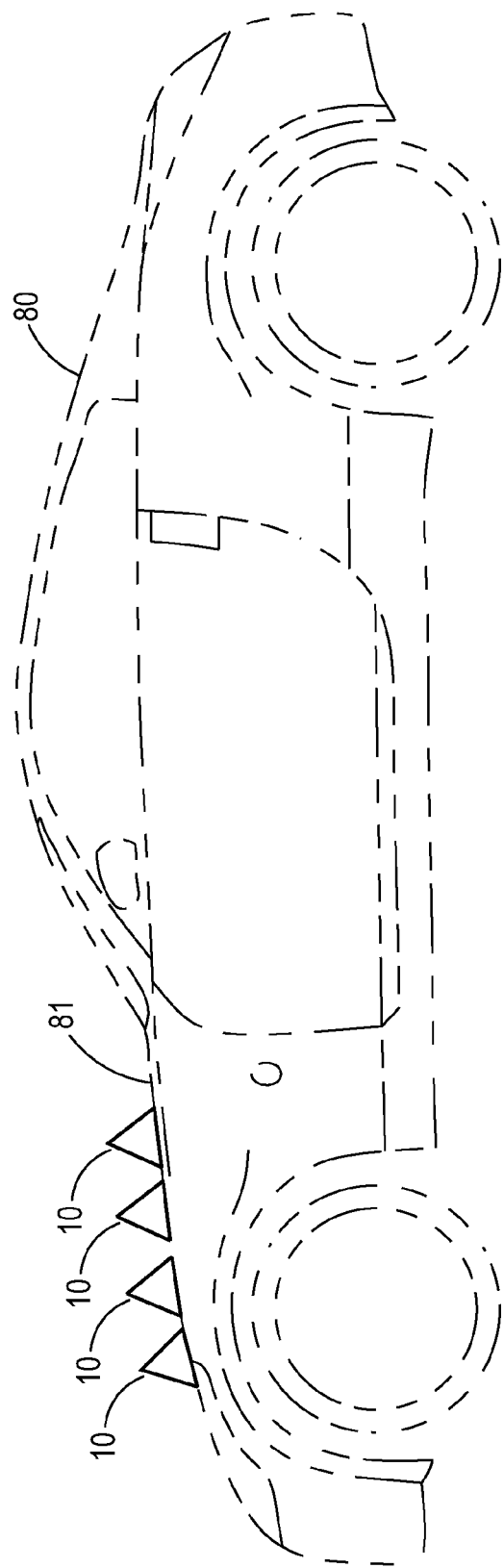
FIG. 11 is a side view of a plurality of cone-like vehicle ornaments positioned along a hood of a vehicle.
Figure 12:
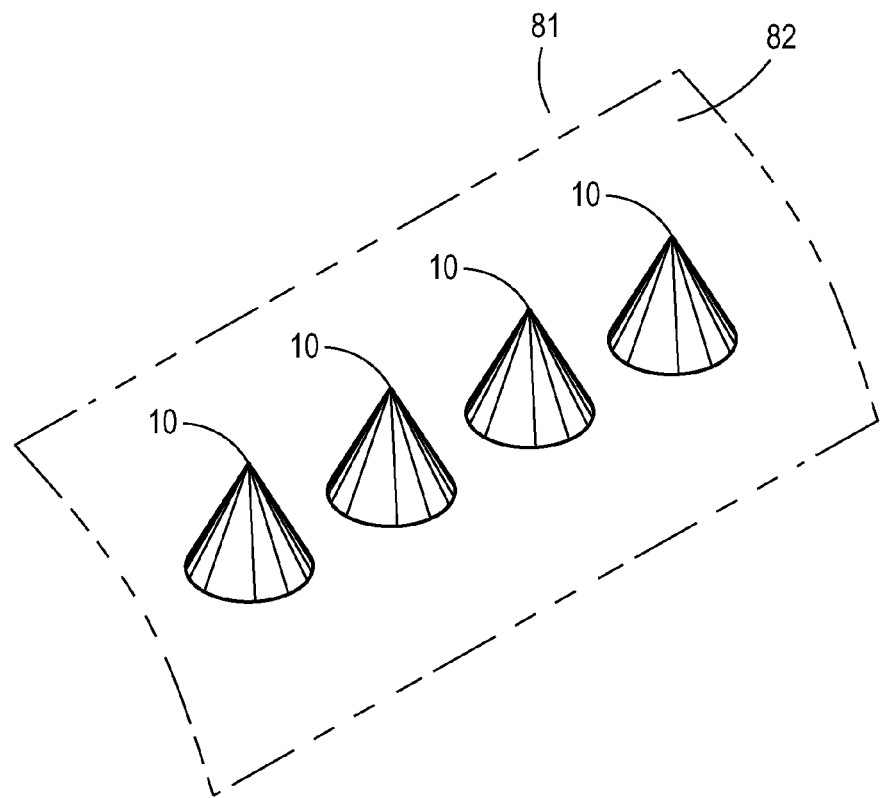
FIG. 12 is a side view of a plurality of cone-like vehicle ornaments positioned along a portion of a hood of a vehicle.
Figure 13:
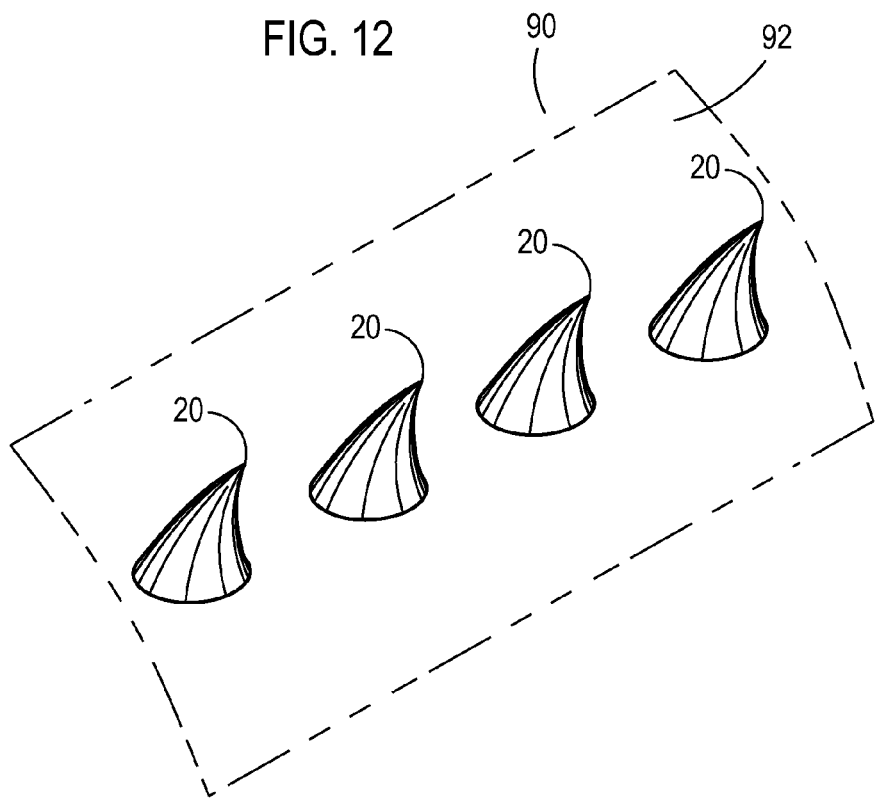
FIG. 13 is a side view of a plurality of thorn-like vehicle ornaments positioned along a portion of a hood of a vehicle.

FIG. 11 provides a side view of a plurality of exemplary cone-like vehicle ornaments 10 positioned along a hood 81 of a vehicle 80. FIG. 12 provides a side elevational view of a plurality of exemplary cone-like vehicle ornaments 10 positioned along a portion 82 of hood 81 of vehicle 80. FIG. 13 is a side elevational view of a plurality of exemplary thorn-like vehicle ornaments 20 positioned along a portion 92 of an outer surface 90 (e.g., a hood, a roof, a trunk surface, a side surface, or any combination thereof) of a vehicle.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A kit comprising components to form at least one vehicle ornament, wherein each vehicle ornament is sized and operatively adapted to attach to an outer surface of a vehicle, said kit comprising (I) at least one vehicle ornament base member, each vehicle ornament base member comprising (a) a substantially flat lower surface that is capable of engaging with the outer surface of a vehicle, said substantially flat lower surface having an outer perimeter with a circular shape with a diameter across said substantially flat lower surface ranging from about 10.2 cm to about 20.3 cm, and (b) an upper base member surface comprising (i) four outer engagement members extending upward from said upper base member surface, (ii) four inner engagement members extending upward from said upper base member surface, (iii) four outer engagement member holes extending thru the four outer engagement members, and (iv) four inner engagement member holes extending into at least a portion of the four inner engagement members, and (II) at least one vehicle ornament upper shaped member, each vehicle ornament upper shaped member comprising (a) a lower surface operatively adapted to engage with said upper base member surface, (b) a three-dimensional shape (i) extending upward from and above said lower surface of said vehicle ornament upper shaped member, and (ii) having an overall height ranging from about 10.2 cm to about 20.3 cm, said lower surface comprising complementary engagement members operatively adapted to (i) connect said vehicle ornament base member to said vehicle ornament upper shaped member or (ii) enable connection of said vehicle ornament base member to said vehicle ornament upper shaped member, said complementary engagement members comprising (a) one or more engaging holes extending thru a side wall of said vehicle ornament upper shaped member, (b) four complementary inner engagement members extending from an inner surface of said vehicle ornament upper shaped member, and (c) four engaging posts extending downward from the four complementary inner engagement members, each of said four engaging posts having a cross-sectional configuration that enables a snug fit within each of the four inner engagement member holes extending into at least a portion of the four inner engagement members.

2. The kit of claim 1, wherein the kit comprises four substantially similar vehicle ornaments.

3. The kit of claim 2, wherein each vehicle ornament has a diameter across the substantially flat lower surface of about 15.2 cm, and an overall height of about 12.7 cm.

4. The kit of claim 1, wherein the kit comprises from two to eight vehicle ornaments comprising (i) two to eight vehicle ornament base members and (ii) two to eight corresponding vehicle ornament upper shaped members.

5. The kit of claim 4, wherein the kit comprises four substantially similar vehicle ornaments comprising (i) four substantially similar vehicle ornament base members and (ii) four substantially similar corresponding vehicle ornament upper shaped members.

6. The kit of claim 5, wherein each of said four engaging posts have a circular cross-sectional configuration that enables a snug fit within each of the four inner engagement member holes extending into at least a portion of the four inner engagement members, each of the four inner engagement member holes having a corresponding circular cross-sectional configuration.

7. The kit of claim 6, wherein each vehicle ornament upper shaped member comprises a cone-like shape, a pyramid-like shape, or a thorn-like shape.

8. A method of modifying a vehicle, said method comprising:
attaching the at least one vehicle ornament from the kit of claim 1 onto an outer surface of the vehicle, the outer surface comprising a hood, a roof, a trunk surface, a side surface, or any combination thereof.

9. A kit comprising two to eight substantially similar vehicle ornaments, wherein each of said two to eight substantially similar vehicle ornaments comprises (I) a base member, each base member comprising (a) a substantially flat lower surface that is capable of engaging with an outer surface of a vehicle, said substantially flat lower surface having an outer perimeter with a circular shape with a diameter across said substantially flat lower surface ranging from about 10.2 cm to about 20.3 cm, and (b) an upper base member surface comprising (i) four outer engagement members extending upward from said upper base member surface, (ii) four inner engagement members extending upward from said upper base member surface, (iii) four outer engagement member holes extending thru the four outer engagement members, and (iv) four inner engagement member holes extending downward into at least a portion of the four inner engagement members, each of said four inner engagement member holes having a hole cross-sectional configuration; (II) an upper shaped member, each upper shaped member comprising (a) a lower surface operatively adapted to engage with said upper base member surface, and (b) a three-dimensional shape (i) extending upward from and above said lower surface of said upper shaped member, (ii) comprising a cone-like shape, a pyramid-like shape, or a thorn-like shape, and (iii) having an overall height ranging from about 10.2 cm to about 20.3 cm; said lower surface comprising complementary engagement members operatively adapted to enable non-rotatable connection of said base member to said upper shaped member, said complementary engagement members comprising (a) one or more engaging holes extending thru a side wall of said upper shaped member, (b) four complementary inner engagement members extending from an inner surface of said upper shaped member, and (c) four engaging posts extending downward from the four complementary inner engagement members, each of said four engaging posts having a cross-sectional configuration substantially similar to said hole cross-sectional configuration of each of said four inner engagement member holes so as to enable a snug fit within each of the four inner engagement member holes extending into at least a portion of the four inner engagement members; and (III) a set of first screws sized to extend through each of (i) said one or more engaging holes extending thru the side wall of said upper shaped member and (ii) into one or more of said four outer engagement member holes.

10. The kit of claim 9, wherein the kit comprises four substantially similar vehicle ornaments comprising (i) four substantially similar vehicle ornament base members and (ii) four substantially similar corresponding vehicle ornament upper shaped members.

11. The kit of claim 9, wherein each of said four engaging posts have a circular cross-sectional configuration that enables a snug fit within each of the four inner engagement member holes extending into at least a portion of the four inner engagement members, each of the four inner engagement member holes having a corresponding circular cross-sectional configuration.

* * * * *